United States Patent
Abruña et al.

(10) Patent No.: US 11,183,688 B2
(45) Date of Patent: Nov. 23, 2021

(54) POROUS FE$_3$O$_4$/S COMPOSITES FOR LI/S BATTERIES

(71) Applicant: Cornell University, Ithaca, NY (US)

(72) Inventors: Héctor D. Abruña, Ithaca, NY (US); Na Zhang, Ithaca, NY (US)

(73) Assignee: CORNELL UNIVERSITY, Ithaca, NY (US)

(*) Notice: Subject to any disclaimer, the term of this patent is extended or adjusted under 35 U.S.C. 154(b) by 0 days.

(21) Appl. No.: 16/959,086

(22) PCT Filed: Dec. 31, 2018

(86) PCT No.: PCT/US2018/068209
§ 371 (c)(1),
(2) Date: Jun. 29, 2020

(87) PCT Pub. No.: WO2019/133994
PCT Pub. Date: Jul. 4, 2019

(65) Prior Publication Data
US 2020/0328412 A1  Oct. 15, 2020

Related U.S. Application Data

(60) Provisional application No. 62/612,078, filed on Dec. 29, 2017.

(51) Int. Cl.
*H01M 4/131* (2010.01)
*H01M 4/38* (2006.01)
(Continued)

(52) U.S. Cl.
CPC ............. *H01M 4/38* (2013.01); *H01M 4/364* (2013.01); *H01M 4/483* (2013.01);
(Continued)

(58) Field of Classification Search
CPC ........ H01M 4/38; H01M 4/364; H01M 4/483; H01M 10/0525; H01M 10/44;
(Continued)

(56) References Cited

U.S. PATENT DOCUMENTS

| 3,507,696 A | 4/1970 | Jackovitz et al. |
| 9,882,241 B2 | 1/2018 | Singh et al. |

(Continued)

FOREIGN PATENT DOCUMENTS

| CN | 105390683 A | 3/2016 |
| CN | 106099022 A | 11/2016 |

(Continued)

OTHER PUBLICATIONS

Gao, G., et al., Fe3O4@S nanoparticles embedded/coated on the multi-wall carbon nanotubes for reccharghable lithium batteries, Chemical Engineering Journal, Sep. 25, 2017, vol. 333, pp. 268-275. https://www.sciencedirect.com/science/article/pii/S1385894717316558.

(Continued)

*Primary Examiner* — Cynthia K Walls
(74) *Attorney, Agent, or Firm* — Johnson, Marcou, Isaacs & Nix, LLC; Paul J. Roman, Jr.

(57) ABSTRACT

Provided are porous Fe$_3$O$_4$/sulfur composites. The composites are composed of porous Fe$_3$O$_4$ nanoparticles and sulfur, where the sulfur loading is 70-85% by weight based on the total weight of the composite. Also provided are batteries having cathodes containing porous FE$_3$O$_4$ composites of the present disclosure.

19 Claims, 12 Drawing Sheets

(51) Int. Cl.
*H01M 4/36* (2006.01)
*H01M 4/48* (2010.01)
*H01M 10/0525* (2010.01)
*H01M 10/44* (2006.01)
*H01M 4/02* (2006.01)

(52) U.S. Cl.
CPC ....... H01M 10/0525 (2013.01); H01M 10/44 (2013.01); *H01M 2004/021* (2013.01)

(58) Field of Classification Search
CPC ........... H01M 2004/021; H01M 4/523; H01M 4/136; H01M 4/131; Y02E 60/10; C01P 2004/64; C01P 2006/12; C01P 2006/16; C09C 1/24; C01B 17/00
See application file for complete search history.

(56) References Cited

U.S. PATENT DOCUMENTS

| | | | |
|---|---|---|---|
| 2012/0207994 | A1 | 8/2012 | Wang et al. |
| 2015/0059931 | A1 | 3/2015 | Ogg et al. |
| 2015/0214555 | A1* | 7/2015 | Visco ................... H01M 4/38 |
| | | | 429/347 |
| 2016/0164075 | A1 | 6/2016 | Garsuch et al. |

FOREIGN PATENT DOCUMENTS

| | | |
|---|---|---|
| CN | 105006557 B | 2/2017 |
| CN | 107230788 A | 10/2017 |
| CN | 107317014 A | 11/2017 |
| CN | 107666011 A | 2/2018 |
| WO | 2018/072275 A1 | 4/2018 |

OTHER PUBLICATIONS

Liu, Y., et al., Fe3O4-Decorated Porous Graphene Interlayer for High-Performance Lithium-Sulfur Batteries, ACS Appl. Mater. Interfaces, Jul. 13, 2018, vol. 10, No. 31, pp. 26264-26273.

Yu, H., et al., Three-dimensionally ordered, ultrathin graphitic-carbon frameworks with cage-like mesoporosity for highly stable Li-S batteries, Nano Research, Jul. 2017, vol. 10, No. 7, pp. 2495-2507.

He, J., et al., Yolk-Shelled C@Fe3O4 Nanoboxes as Efficient Sulfur Hosts for High-Performance Lithium-Sulfur Batteries, Advanced Materials, Sep. 2017, vol. 29, No. 34, 5 pages.

Zheng, J., Elaborately Designed Micro-Mesoporous Graphitic Carbon Spheres as Efficient Polysulfide Reservoir for Lithium-Sulfur Batteries, ACS Energy Letters, Apr. 18, 2017, vol. 2, No. 5, pp. 1105-1114.

Fan, L., et al., Fe-MOF derived jujube pit like Fe3O4/C composite as sulfur host for lithium-sulfur battery, Electrochimica Acta, Feb. 1, 2019, vol. 295, pp. 444-451.

Park, S., et al., Sulfur-loaded Monodisperse Carbon Nanocapsules Anchored on Graphene Nanosheets as Cathodes for High Performance Lithium-Sulfur Batteries, Journal of Materials Chemistry A, Jan. 2017, vol. 5, No. 3, pp. 975-981.

Park, S, et al., Scalable Synthesis of Honeycomb-like Ordered Mesoporous Carbon Nanosheets and Their Application in Lithium-Sulfur Batteries, ACS Applied Materials & Interfaces, Jan. 25, 2017, vol. 9, No. 3, pp. 2430-2438.

Zhao, C., et al., Prussian blue-derived Fe2O3/sulfur composite cathode for lithium-sulfur batteries, Materials Letters, Sep. 1, 2014, vol. 137, pp. 52-55.

Liu, D., et al., Catalytic Effects in Lithium-Sulfur Batteries: Promoted Sulfur Transformation and Reduced Shuttle Effect, Advance Science, Sep. 5, 2017, vol. 5, 12 pages.

Kanzaki, S., et al., Nano-sized gamma-Fe2O3 as lithium battery cathode, Journal of Power Sources, Apr. 27, 2005, vol. 146, pp. 323-326.

Kanzaki, S., et al., Effect of chemical oxidation for nano-size gamma-Fe2O3 as lithium battery cathode, Journal of Power Sources, Jan. 12, 2007, vol. 165, pp. 403-407.

Tao, H., et al., Improved lithium-sulfur batteries with a conductive coating on the separator to prevent the accumulation of inactive S-related species at the cathode-separator interface, Energy and Environmental Science, Aug. 7, 2014, vol. 7, No. 10, pp. 3381-3390.

Park, M., Development of Lithium Ion Battery Nano-Synthesized Electrode Materials Using Fe3O4 and RGo, Society for Science Abstract, 2017, 1 page.

Shen, C., et al., Porous Fe2O3 Doped Cathodes for Lithium-Sulfur Batteries, ECS Meeting Abstracts, Apr. 1, 2014, vol. MA2014-01, 2 pages.

Ito, S., et al., Lithium battery having a large capacity using Fe3O4 as a cathode material, Journal of Power Sources, May 31, 2005, vol. 146, pp. 319-322.

Liu, Y., et al., Nitrogen-doped carbon nanotube sponge with embedded Fe/Fe3C nanoparticles as binder-free cathodes for high capacity lithium-sulfur batteries, J. Mater. Chem. A., Aug. 20, 2018, , vol. 6, pp. 17473-17480.

Zhu, J., et al., Electrospun carbon nanofibers decorated with MnO nanoparticles as a sulfur-absorbent for lithium-sulfur batteries, Ceramics International, Jun. 2018, vol. 44, No. 14, 7 pages.

Gao, Z., et al., Ferromagnetic Nanoparticle-Assisted Polysulfide Trapping for Enhanced Lithium-Sulfur Batteries, Advanced Functional Materials, Apr. 6, 2018, vol. 28, No. 20, 1800563, 8 pages.

Lee, J., et al., Multi-Heteroatom-Doped Hollow Carbon Attached on Graphene Using LiFePO4 Nanoparticles as Hard Templates for High-Performance Lithium-Sulfur Batteries, ACS Appl. Mater. Interfaces, Jul. 12, 2018, vol. 10, No. 31, pp. 26485-26493.

Zhong, Y., et al., Surface Chemistry in Cobalt Phosphide-Stabilized Lithium-Sulfur Batteries, JACS, Jan. 8, 2018, vol. 140, No. 4, pp. 1455-1459.

Lin, C., et al., Porous nitrogen-doped carbon/MnO coaxial nanotubes as an efficient sulfur host for lithium sulfur batteries, Nano Research, Sep. 28, 2018, vol. 12, pp. 205-210.

Li, C., et al., Titanium nitride hollow nanospheres with strong lithium polysulfide chemisorption as sulfur hosts for advanced lithium-sulfur batteries, Nano Research, Mar. 12, 2018, vol. 11, pp. 4302-4312.

Wang, Y., et al., Polar and conductive iron carbide@N-doped porous carbon nanosheets as a sulfur host for high performance lithium sulfur batteries, Chemical Engineering Journal, Feb. 15, 2019, vol. 358, pp. 962-968.

* cited by examiner

POROUS FE₃O₄/S COMPOSITES FOR LI/S BATTERIES

CROSS REFERENCE TO RELATED APPLICATIONS

This application claims priority to U.S. Provisional Application No. 62/612,078, filed on Dec. 29, 2017, the disclosure of which is incorporated by reference.

STATEMENT REGARDING FEDERAL FUNDING

This invention was made with government support under contract No. DE-SC0001086 awarded by the Department of Energy. The government has certain rights in the invention.

FIELD OF DISCLOSURE

The present disclosure relates to $Fe_3O_4$ nanoparticles. The present disclosure more specifically relates to composites comprising $Fe_3O_4$ nanoparticles for Li/S batteries.

BACKGROUND

Rechargeable batteries play an important role in life. Over the last two decades in particular, lithium ion batteries, one of the most widespread energy storage devices, have been widely implemented in a broad spectrum of devices. However, Li-ion batteries that employ lithium intercalation compounds as cathodes are approaching the theoretical limits for energy density. These devices are barely able to satisfy increasingly large-scale applications, such as electric vehicles with longer driving ranges, and are likely not suitable for grid electrical energy storage due to cost constraints. Thus it is important to develop and implement new materials for high energy rechargeable batteries with high power and energy density.

Li/S batteries are considered a promising next-generation energy storage technologies, in particular for automotive applications and other larger scale applications. In recent years, lithium-sulfur (Li/S) batteries have been widely considered promising candidates for next generation rechargeable batteries. As one of the most abundant elements on earth, sulfur provides high theoretical specific capacity (1672 mAh $g^{-1}$) and energy density of 2600 Wh $kg^{-1}$. Sulfur's advantages lie in its environmentally friendly qualities and low cost (currently approximately $0.09/kg ($90/t)).

Nevertheless, in its current embodiment, some sulfur compounds require treatments to ensure that some of the undesirable features of sulfur do not compromise battery performance. More specifically, sulfur's electrically insulating nature can manifest itself in low material utilization rates. Additionally, during discharge, long-chain lithium polysulfides (LiPSs) are formed as intermediates which have high solubility in the electrolyte and can shuttle between cathode and anode, leading to diminution of accessible active material over time, and fast capacity decay/fade.

Researchers have devoted tremendous efforts to improving the conductivity of sulfur electrodes and mitigating lithium polysulfide dissolution and/or loss from the electrode. Among different methods, combining sulfur with carbonaceous materials, such as porous carbons, activated carbons, graphene and polymer materials, is a popular and effective means to enhance conductivity, while also containing LiPSs in the structure of the carbon materials. Although the cycling stability of Li/S batteries comprised of these composites can be enhanced in the short term, after long-term cycling, the capacity decay is still very severe. Recently, some metal oxides have been found to have strong chemical interaction with LiPSs. However, most metal oxides/hydroxides have poor electrical conductivity, thus the active material utilization remains very low. Also, even though these metal oxides can provide high affinity, the content of sulfur in the whole cathode electrode is very low (<60%).

An additional challenge to overcome, while preparing Li—S batteries, is to ensure accurate and precise characterization of the nanoscale distribution of sulfur. Some researchers have routinely used scanning/transmission electron microscopy (SEM/TEM) under high-vacuum conditions to study the nano-structure of sulfur-host material composites. High vacuum SEM/TEM observations have led researchers to attribute battery performance enhancements to the physical confinement of sulfur in or on the host material. However, sulfur is prone to sublimation in high vacuum environments, like that of an electron microscope sample chamber. Recent studies have begun to make the Li—S battery community aware of the fact that sulfur sublimation, in an electron microscope, can cause loss of sulfur from a sulfur electrode sample, as well as a redistribution of sulfur within the sample, due to the capture of sublimated sulfur gas by porous materials. Characterization of sulfur battery materials by standard, room temperature electron microscopy may therefore give misleading results, and alternative methods are required.

Thus, there is an ongoing and unmet need for improved sulfur materials for battery applications.

SUMMARY OF THE DISCLOSURE

The present disclosure relates to porous $Fe_3O_4$/sulfur composites. The composites can be used in batteries such as for example, lithium/sulfur batteries.

In various examples, the present disclosure provides materials that improve existing materials for battery (e.g., lithium/sulfur battery, such as, for example, a rechargeable lithium/sulfur battery) applications, providing a material that has desirable effectiveness, is significantly less expensive, and is environmentally more benign than known alternatives.

In an aspect, the present disclosure provides porous $Fe_3O_4$/sulfur composites. The porous $Fe_3O_4$ composites comprise porous $Fe_3O_4$ nanoparticles and sulfur. In an example, the porous $Fe_3O_4$ nanoparticles are made by a method described herein.

In another aspect, the present disclosure provides batteries. For example, the batteries are lithium/sulfur batteries. The batteries may be rechargeable batteries. The batteries comprise one or more cathode comprising a porous $Fe_3O_4$/sulfur composite described herein.

BRIEF DESCRIPTION OF THE FIGURES

For a fuller understanding of the nature and objects of the disclosure, reference should be made to the following detailed description taken in conjunction with the accompanying figures.

DETAILED DESCRIPTION

Figure 1:
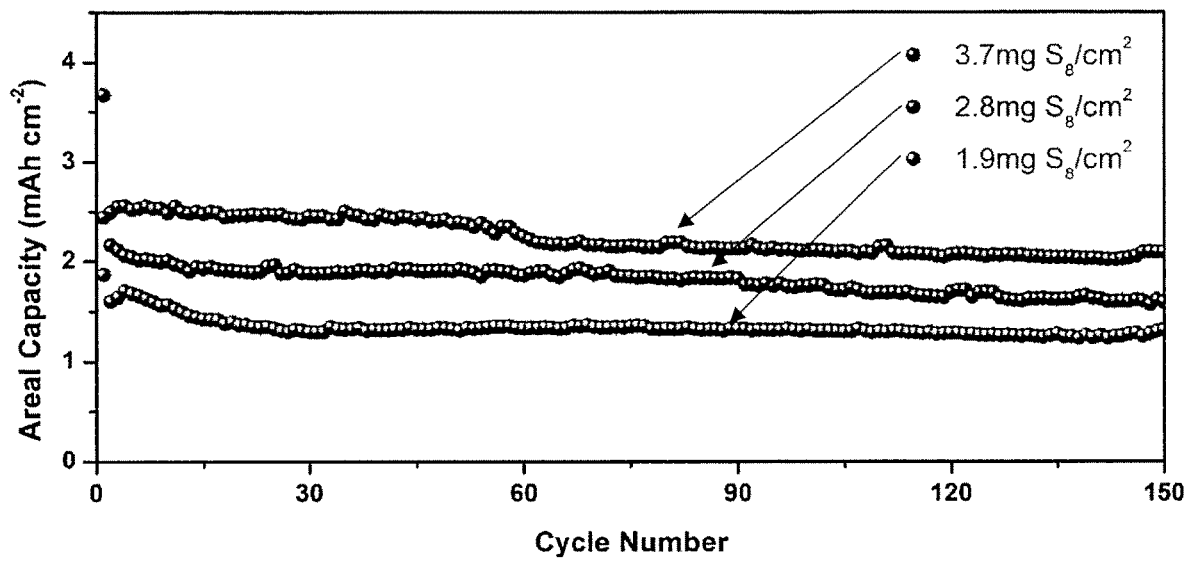
FIG. 1 shows cycling performance of high-loading $Fe_3O_4$/S at a charge/discharge rate of 0.2 C for 150 cycles. All cells were pre-conditioned at 0.05 C for the first cycle.
Figure 2:
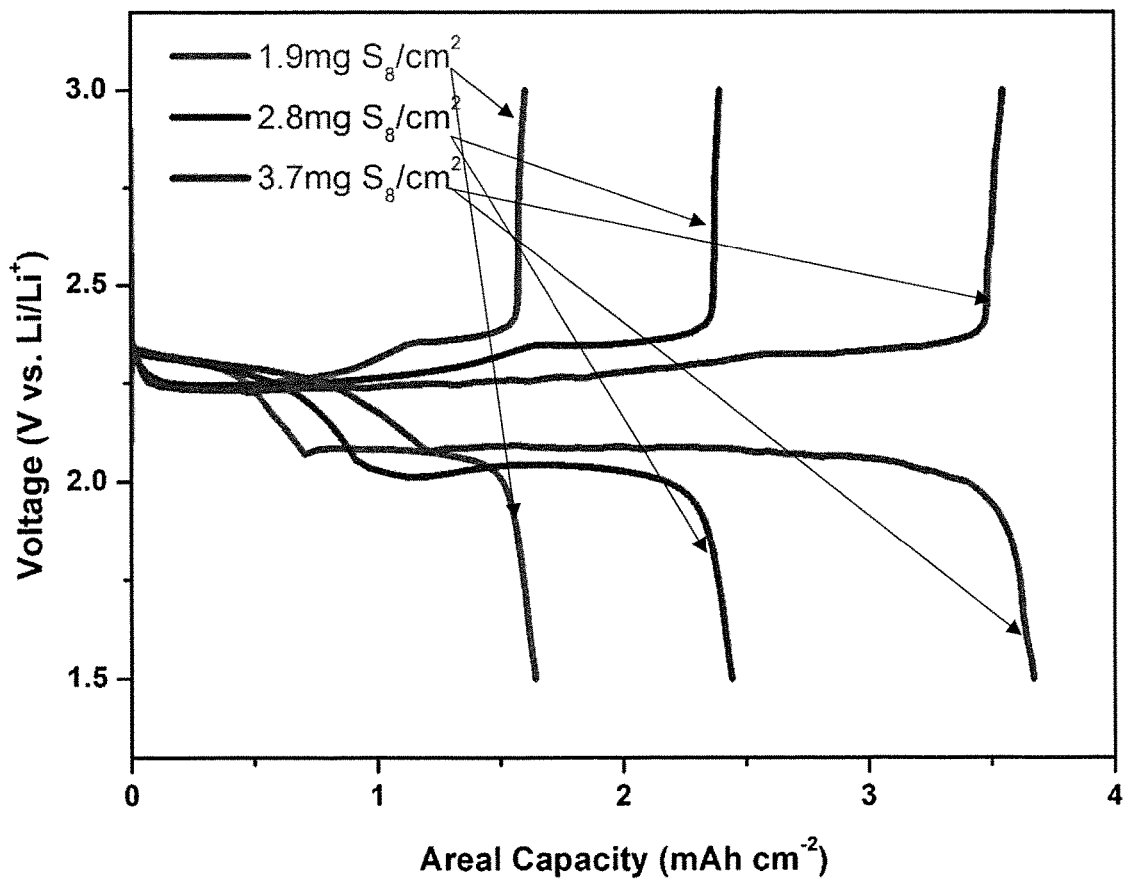
FIG. 2 shows initial cycle voltage profiles of the electrodes with various loadings at a rate of 0.05 C.
Figure 3:
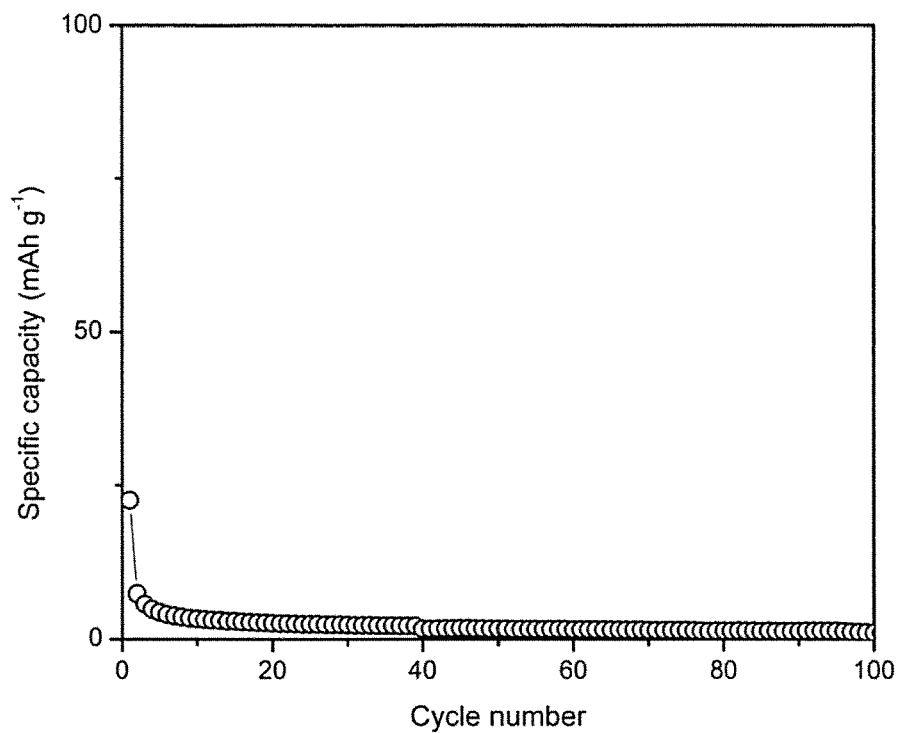
FIG. 3 shows electrochemical performance of the synthesized $Fe_3O_4$ nanospheres.

Although claimed subject matter will be described in terms of certain examples, other examples, including examples that do not provide all of the benefits and features set forth herein, are also within the scope of this disclosure. Various structural, logical, process, and electronic step changes may be made without departing from the scope of the disclosure.

Ranges of values are disclosed herein. The ranges set out an example of a lower limit value and an example of an upper limit value. Unless otherwise stated, the ranges include all values to the magnitude of the smallest value (either lower limit value or upper limit value) and ranges between the values of the stated ranges.

The present disclosure relates to porous $Fe_3O_4$/sulfur (S) composites. The composites can be used in batteries such as, for example, lithium/sulfur batteries.

In various examples, the present disclosure provides materials that address issues with existing materials for battery (e.g., lithium/sulfur battery, such as, for example, a rechargeable lithium/sulfur battery) applications, providing a material that has desirable effectiveness, is significantly less expensive, and is environmentally more benign than previously known alternatives.

In an aspect, the present disclosure provides porous $Fe_3O_4$/S composites. The porous $Fe_3O_4$ composites comprise porous $Fe_3O_4$ nanoparticles and sulfur. In several examples, the porous $Fe_3O_4$/sulfur composites consist essentially of or consist of porous $Fe_3O_4$ nanoparticles and sulfur. In an example, the porous $Fe_3O_4$ nanoparticles are made by a method described herein.

The porous $Fe_3O_4$ nanoparticles can have various sizes. In an example, the majority of the particles have a longest dimension (e.g., diameter) of 20-140 (e.g., 80-140 nm), including all integer nm values and ranges therebetween. In various examples, 50.1-75%, 50.1-80%, 50.1-85%, 50.1-90%, 50.1-95%, 50.1-99.9%, 50.1-99.99%, or 50.1-100% of the particles have a longest dimension (e.g., diameter) of 20-140 nm (e.g., 80-140 nm), including all integer nm values and ranges therebetween.

The porous $Fe_3O_4$ nanoparticles can have various pore sizes. In an example, the pore size distribution is 2 nm to 80 nm, including all 0.1 nm values and ranges therebetween. In various examples, it can be estimated that at least 80% of pores or channels have the diameter of less than 80 nm. In an example, the average pore width is 35-50 nm (e.g., 35, 36, 37, 38, 39, 40, 41, 42, 43, 44, 45, 46, 47, 48, 49, or 50 nm). In an example, the calculated average pore width is about 41 nm.

In various examples, the pore size distribution of the porous $Fe_3O_4$ material is unimodal, bimodal, or multimodal. In various examples, the pore size distribution of the porous $Fe_3O_4$ material has at least two peaks (e.g., two major peaks). The center of the first peak (e.g., first major peak) has a maximum in the range from 2 nm to 20 nm, from 2 nm to 15 nm, from 5 nm to 10 nm, less than 20 nm, less than 15 nm, less than 10 nm, less than 8 nm, less than 5 nm. The maximum of the second peak (e.g., second major peak) ranges from 20 nm to 150 nm, from 30 nm to 100 nm, from 40 nm to 80 nm, from 50 nm to 80 nm, greater than 20 nm, greater than 30 nm, greater than 40 nm, greater than 50 nm, greater than 60 nm, greater than 70 nm, or greater than 80 nm. Without intending to be bound by any particular theory, it is expected the larger sized pores create desirable polysulfide adsorption due to better mass transfer and the smaller sized pores can benefit the adsorption due to higher surface area. The bimodal pore size distribution combines the advantages of both larger sized pores and smaller sized pores.

The porous $Fe_3O_4$ nanoparticles can have various morphologies. For example, the porous $Fe_3O_4$ nanoparticles are nanospheres.

The porous $Fe_3O_4$ nanoparticles can have various porosity. For example, the porous $Fe_3O_4$ nanoparticles have a surface area (e.g., specific surface area) of 20-200 $m^2/g$, including all integer $m^2/g$ values and ranges therebetween. In various examples, the porous $Fe_3O_4$ nanoparticles have a surface area (e.g., specific surface area) of 20-200 $m^2/g$, 25-200 $m^2/g$, 30-200 $m^2/g$, 50-200 $m^2/g$, 20-190 $m^2/g$, 20-180 $m^2/g$, 20-170 $m^2/g$, 20-150 $m^2/g$, or 20-100 $m^2/g$, including all integer $m^2/g$ values and ranges therebetween. In an example, the specific surface area derived from BET is 16.6 $m^2/g$. The surface area can be determined by methods known in the art. For example, the surface area is determined by a Brunauer, Emmett, and Teller (BET) measurement.

The porous $Fe_3O_4/S$ composites can have (e.g., comprise) various amounts of sulfur. In an example, the sulfur is crystalline sulfur. It is desirable that a porous $Fe_3O_4/S$ composite has a sulfur loading of greater than 70% by weight based on the total weight of the composite. In an example, a porous $Fe_3O_4/S$ composite has a sulfur loading of 70-85%, including all integer % by weight values and ranges therebetween, based on the total weight of the composite. In various examples, a porous $Fe_3O_4/S$ composite has a sulfur loading of 71-85%, 72-85%, 73-85%, 74-85%, 75-85%, or 80-85% by weight, based on the total weight of the composite.

The porous $Fe_3O_4/S$ composites and $Fe_3O_4$ nanoparticles can have desirable properties. For example, the porous $Fe_3O_4/S$ composites and/or $Fe_3O_4$ nanoparticles adsorb polysulfides. In various examples, a porous $Fe_3O_4$/sulfur composite and/or $Fe_3O_4$ nanoparticles can decrease the amount of observable polysulfides by 50% or more, 60% or more, 70% or more, 80% or more, 85% or more, 90% or more, or 95% or more in a polysulfide solution. The amount of observable polysulfides can be determined by methods known in the art. For example, the amount of observable polysulfides is determined by optical methods (e.g., UV-vis). In an example, the amount of observable polysulfides can be the amount of the polysulfides in a battery system in any cycle. In another example, the amount of observable polysulfides can be the amount of the polysulfides in the electrolyte of a battery system without porous $Fe_3O_4$/sulfur composite. Without intending to be bound by any particular theory, the porous $Fe_3O_4$ nanoparticles and/or $Fe_3O_4/S$ composite comprising $Fe_3O_4$ nanoparticles decrease the amount of observable polysulfides due to its high adsorption of polysulfides. The adsorption is at least 0.1 mmol polysulfide per gram $Fe_3O_4$, at least 0.2 mmol polysulfide per gram $Fe_3O_4$, at least 0.3 mmol polysulfide per gram $Fe_3O_4$, at least 0.4 mmol polysulfide per gram $Fe_3O_4$, at least 0.5 mmol polysulfide per gram $Fe_3O_4$, at least 1 mmol polysulfide per gram $Fe_3O_4$. In various examples, the adsorption is about 0.1 mmol to 10 mmol polysulfide per gram $Fe_3O_4$, including every 0.01 mmol value and range therebetween (e.g., 0.4 mmol to 10 mmol polysulfide per gram $Fe_3O_4$). In various examples, the adsorption is about 0.3 mmol to 1 mmol polysulfide per gram $Fe_3O_4$, 0.3 mmol to 0.5 mmol polysulfide per gram $Fe_3O_4$, 0.4 mmol to 0.8 mmol polysulfide per gram $Fe_3O_4$, or 0.4 mmol to 1 mmol polysulfide per gram $Fe_3O_4$.

The porous $Fe_3O_4$ of the present disclosure have desirable properties including, but not limited to, surface area, morphology, porosity, particle size, pore size distribution, and the ability to adsorb more lithium polysulfides.

In an aspect, the present disclosure provides methods of preparing $Fe_3O_4/S$ composites of the present disclosure.

In an example, a method for preparing $Fe_3O_4/S$ composite comprises melt-diffusing sulfur (e.g., crystalline sulfur) into $Fe_3O_4$ nanoparticles. Methods of the present disclosure may yield a composite where the sulfur content is at least 70-85% by weight based on the total weight of the composite.

In another aspect, the present disclosure provides batteries. For example, the batteries are lithium/sulfur batteries. The batteries may be rechargeable batteries. The batteries comprise one or more cathode comprising a porous $Fe_3O_4$/sulfur composite described herein.

The present disclosure allows for utilization of, in an example, approximately fifteen percent (15%) of carbon on a gravimetric basis, together with the porous $Fe_3O_4$/sulfur composite, to create a composite with enhanced conductivity, to provide a desirable cathode for a Li/S battery. In various examples, this allows for a cathode with a sulfur content at or above seventy percent (70%) by weight.

A cathode comprising a porous $Fe_3O_4$/sulfur composite can have (e.g., comprise) various amounts of sulfur. The sulfur may be crystalline sulfur. For example, one or more cathode comprising a porous $Fe_3O_4$/sulfur composite has a sulfur loading of at least 70-85% by weight, including all integer % by weight values and ranges therebetween, based on the total weight of the cathode. In an various examples, one or more cathode comprising a porous $Fe_3O_4$/sulfur composite has a sulfur loading of at least 70% by weight, 71% by weight, 72% by weight, 73% by weight, 74% by weight, 75% by weight, 76% by weight, 77% by weight, 78% by weight, 79% by weight, 80% by weight, 81% by weight, 82% by weight, 83% by weight, 84% by weight, or 85% by weight, based on the total weight of the cathode. In various examples, one or more cathode comprising a porous $Fe_3O_4$/sulfur composite has a sulfur loading of 71-85%, 72-85%, 73-85%, 74-85%, 75-85%, or 80-85% by weight, based on the total weight of the cathode.

A cathode of the present disclosure comprises a layer of porous $Fe_3O_4/S$ composite. The layer of porous $Fe_3O_4/S$ composite can have various thicknesses. In various examples, the layer has a thickness of 1-500 µm, including every 0.1 µm values and ranges therebetween (e.g., 30-500 µm, 1-100 µm, or 1-20 µm).

The cathode may further comprise various additional materials. In various examples, the cathode further comprises carbon material(s) (e.g., Super-P® carbon, carbon paper, and the like) and/or various binder material(s) (e.g., polymer materials such as, for example, p-ydf, Teflon, and the like). The carbon material(s) may be conducting. Polyvinylidene-fluoride (PVDF) is a non-limiting example of a suitable binder material. Examples of suitable additional materials for cathodes (e.g., carbon materials and binder materials) are known in the art.

A cathode may not comprise more than 3% or any conducting material other than the porous $Fe_3O_4$ nanoparticles and/or binder material. For example, a cathode does not comprise more than 3% or any conducting material such as, for example, conducting carbon material, graphene, and the like and/or a binder material. Examples of binder materials used in battery materials are known in the art. Non-limiting examples of binder materials are provided herein.

The batteries can comprise one or more anode. Various anode materials (e.g., anode materials for lithium/sulfur batteries) are known in the art.

The batteries can comprise one or more electrolyte. Various electrolyte materials (e.g., electrolyte materials suitable for lithium/sulfur batteries) are known in the art.

The batteries (e.g., lithium/sulfur batteries) can comprise current collector(s). For example, the current collector are each independently fabricated of a metal (e.g., aluminum, copper, or titanium) or metal alloy (aluminum alloy, copper alloy, or titanium alloy).

The batteries (e.g., lithium/sulfur batteries) can may comprise various additional structural components (e.g., bipolar plates, external packaging, and electrical contacts/leads to connect wires). In an example, the battery further comprises bipolar plates. In an example, the battery further comprises bipolar plates and external packaging, and electrical contacts/leads to connect wires.

The cathode(s), anode(s) (if present), electrolyte(s) (if present), and current collector(s) (if present) may form a cell. In this case, the battery comprises a plurality of cells separated by one or more bipolar plates. The number of cells in the battery is determined by the performance requirements (e.g., voltage output) of the battery and is limited only by fabrication constraints. For example, the battery comprises 1 to 500 cells, including all integer number of cells and ranges therebetween.

In an example, the battery or battery cell has one planar cathode and/or anode—electrolyte interface or no planar cathode and/or anode—electrolyte interfaces.

Batteries can comprise one or more electrochemical cells, such cells generally comprising a cathode, an anode, and an electrolyte. Provided that they comprise one or more cathode of the present disclosure, in various examples, the battery comprises any suitable component part (e.g., anode, electrolyte, separator, etc.). It is within the discretion of a person having ordinary skill in the art to readily select such components, and non-limiting examples of such parts are described, for example, in International Patent Application Publication No. WO/2017/127674, the contents of which with respect to battery structures and battery components are hereby incorporated by reference.

The batteries can have various uses. For example, the batteries are used in automotive and other large scale applications.

Batteries of the present disclosure can exhibit desirable properties as discussed herein. The batteries can exhibit stable cycling performance and desirable energy density (e.g., volumetric and/or gravimetric energy density). For example, a battery exhibits an areal capacity of at least 3.5 mAh cm$^{-2}$ (e.g., 3.5 to 4.5 mAh cm$^{-2}$, including all 0.1 mAh cm$^{-2}$ values and ranges therebetween). In another example, a battery exhibits an areal capacity of 3.5 to 4.5 mAh cm$^{-2}$, including all 0.1 mAh cm$^{-2}$ values and ranges therebetween, after 100 cycles (e.g., charge/discharge cycles). In another example, a battery exhibits an areal capacity of 1.5-4.5 mAh cm$^{-2}$ (e.g., 1.5-4.5 mAh cm$^{-2}$, 1.5-3.5 mAh cm$^{-2}$, 3.5-4.5 mAh cm$^{-2}$, or 3.7-4.5 mAh cm$^{-2}$), including all 0.1 mAh cm$^{-2}$ values and ranges therebetween. In another example, a battery exhibits an areal capacity of at least 1.5 mAh cm$^{-2}$, at least 2.0 mAh cm$^{-2}$, at least 2.5 mAh cm$^{-2}$, at least 3.5 mAh cm$^{-2}$. The desirable energy density provides smaller batteries for a given energy than batteries without a one or more cathode comprising a porous $Fe_3O_4$/sulfur composite described herein. In various examples, at least 80%, at least 85%, at least 86%, or at least 90% of the capacity was retained after 100 cycles for a battery comprising the $Fe_3O_4$/S composite. In various other examples, at least 80%, at least 85%, at least 86%, or at least 90% of the capacity was retained after 150 cycles for a battery comprising the $Fe_3O_4$/S composite. In various other examples, at least 80%, at least 85%, at least 86%, or at least 90% of the capacity was retained after 200 cycles for a battery comprising the $Fe_3O_4$/S composite. In various examples, at least 80%, at least 85%, at least 86%, at least 90%, or at least 91% of the capacity (2nd cycle) was retained after 100 cycles or after 150 cycles for a battery comprising the $Fe_3O_4$/S composite.

The porous $Fe_3O_4$/sulfur composites can adsorb polysulfides. Without intending to be bound by any particular theory it is considered that use of the porous $Fe_3O_4$/sulfur composites as cathode materials significantly mitigates polysulfide dissolution. It is considered that porous $Fe_3O_4$ nanoparticles and porous $Fe_3O_4$/sulfur composites (and cathodes comprising such materials) with desirable surface area have the ability to adsorb lithium polysulfides, which can lead to significantly reduced polysulfide shuttling during cycling. In various examples, a battery with one or more cathode comprising porous $Fe_3O_4$/sulfur composite decreases the amount of observable polysulfides by 50% or more, 60% or more, 70% or more, 80% or more, 85% or more, 90% or more, or 95% or more relative to the same battery without one or more cathode comprising porous $Fe_3O_4$/sulfur composite. The amount of observable polysulfides can be determined by methods known in the art. For example, the amount of observable polysulfides is determined by optical methods.

In the following Statements, various examples of nanoparticles, composites, batteries, and methods of using thereof are described:

Statement 1. A porous $Fe_3O_4$/sulfur ($Fe_3O_4$/S) composite comprising porous $Fe_3O_4$ nanoparticles and sulfur, where the sulfur loading is 70-85% by weight based on the total weight of the composite.

Statement 2. The porous $Fe_3O_4$/S composite according to Statement 1, where the $Fe_3O_4$ nanoparticles are $Fe_3O_4$ nanospheres.

Statement 3. The porous $Fe_3O_4$/S composite according to any one of the preceding Statements, where the majority of the nanoparticles have a longest dimension of 20-140 nm (e.g., 80-140 nm), including every 0.1 nm value and range therebetween.

Statement 4. The porous $Fe_3O_4$/S composite according to any one of the preceding Statements, where the porous $Fe_3O_4$ nanoparticles have a surface area of 20-200 m$^2$/g.

Statement 5. The porous $Fe_3O_4$/S composite according to any one of the preceding Statements, where the porous $Fe_3O_4$ nanoparticles have an average pore diameter of 35-50 nm (e.g., 35, 36, 37, 38, 39, 40, 41, 42, 43, 44, 45, 46, 47, 48, 49, or 50 nm).

Statement 6. The porous $Fe_3O_4$/S composite according to any one of the preceding Statements, where at least 80% of the pores of the porous $Fe_3O_4$ nanoparticles have a pore diameter of 80 nm or less.

Statement 7. The porous $Fe_3O_4$/S composite according to any one of the preceding Statements, where the sulfur is disposed on a non-pore surface and/or a pore surface of the porous $Fe_3O_4$ nanoparticles.

Statement 8. The porous $Fe_3O_4$/S composite according to any one of the preceding Statements, where the porous $Fe_3O_4$ nanoparticles decrease the amount of observable polysulfides by 50% or more, 60% or more, 70% or more, 80% or more, 90% or more, or 95% or more in a polysulfide solution.

Statement 9. The porous $Fe_3O_4/S$ composite according to any one of the preceding Statements, where the porous $Fe_3O_4$ nanoparticles adsorb 0.1-10 mmol polysulfide per gram of $Fe_3O_4$, including every 0.01 mmol polysulfide per gram of $Fe_3O_4$ value and range therebetween.

Statement 10. The porous $Fe_3O_4/S$ composite according to any one of the preceding Statements, where at least a portion of the sulfur is crystalline.

Statement 11. A battery comprising one or more cathode comprising a porous $Fe_3O_4/S$ composite of any one of Statements 1-10.

Statement 12. The battery according to Statement 11, where the battery is a rechargeable battery.

Statement 13. The battery according to Statement 11 or 12, where the battery has an areal capacity of 1.5-4.5 mAh $cm^{-2}$ (e.g., 1.5-4.5 mAh $cm^{-2}$, 1.5-3.5 mAh $cm^{-2}$, 3.5-4.5 mAh $cm^{-2}$, or 3.7-4.5 mAh $cm^{-2}$), including every 0.01 mAh $cm^{-2}$ value and range therebetween.

Statement 14. The battery according to any one of Statements 11-13, where the battery's areal capacity is maintained for at least 200, at least 150 cycles, or 100 cycles.

Statement 15. The battery according to any one of Statements 11-14, where the battery has a coulombic efficiency of 99% or greater.

Statement 16. The battery of to any one of Statements 11-15, where the cathode comprises a layer of the porous $Fe_3O_4/S$ composite having a thickness of 1-500 μm (e.g., 1-100 μm, 1-20 μm, or 30-500 μm), including all 0.1 μm value and range therebetween.

Statement 17. The battery according to any one of Statements 11-16, where the battery comprises one or more anode and/or one or more electrolyte and/or one or more current collector and/or one or more additional structural components.

Statement 18. The battery according to any one of Statements 11-17, where the one or more additional structural component is chosen from bipolar plates, external packaging, electrical contacts/leads to connect wires, and combinations thereof.

Statement 19. A battery comprising a plurality of cells, each cell comprising one or more cathode comprising a porous $Fe_3O_4/S$ composite according to any one of Statements, and optionally, one or more anode(s), electrolyte(s), and current collector(s).

Statement 20. The battery according to Statement 19, where the battery comprises 1 to 500 cells, including all integer values and ranges therebetween.

Statement 21. A battery comprising a cathode, an anode, and an electrolyte and configured to provide power to an external circuit, wherein the cathode comprises a porous $Fe_3O_4/S$ composite present as a layer adhered to a current collector such that an areal sulfur loading on the current collector is 1 and 4 mg $S/cm^2$, characterized in that an impedance of the battery measured during its first discharge through the external circuit is lower than the impedance of an otherwise identical battery comprising a cathode with a lower areal sulfur loading.

Statement 22. A method of preparing a $Fe_3O_4/S$ composite comprising melt-diffusing sulfur into $Fe_3O_4$ nanoparticles, wherein the sulfur content is at least 70-85% by weight based on the total weight of the composite.

Statement 23. The method according to Statement 22, where at least of a portion of the sulfur is crystalline.

Statement 24. The method of according to Statements 22 or 23, where the $Fe_3O_4$ nanoparticles are $Fe_3O_4$ nanospheres.

The following examples are intended to illustrate particular embodiments and examples of the present disclosure, but are by no means intended to limit the scope of the present disclosure.

Example 1

The following example describes preparation and characterization of $Fe_3O_4$ nanospheres of the present disclosure.

Experimental section. A. Preparation of porous $Fe_3O_4$: Porous $Fe_3O_4$ nanospheres were synthesized via a hydrothermal reaction. 1.35 g of $FeCl_3.6H_2O$ were dissolved in 60 mL of ethylene glycol, followed by the addition of 3.85 g of ammonium acetate. After stirring for 90 min, the solution was transferred to a Teflon-lined stainless steel autoclave with a capacity of 100 mL, and kept at 200° C. for 20 h. After cooling down, the precipitate was centrifuged and washed with deionized water.

B. Preparation of $S/Fe_3O_4$ composites: $S/Fe_3O_4$ composites were prepared via a simple melt-diffusion method. A mixture of porous $Fe_3O_4$ nanospheres and sulfur powder (15:85 weight ratio) was heated under ambient atmosphere at 155° C. for 12 h.

C. Electrochemical measurements: Electrodes with <1.5 mg cm' sulfur loading were prepared by mixing the sulfur composite described above with Super P carbon and PVDF binder in NMP in a weight ratio of 75:15:10. The resulting slurry was doctor-blade coated onto carbon coated Al foil current collectors to prepare the cathodes. For the preparation of high loading (~70 wt % of sulfur in the entire electrode composite assembly) and thicker electrodes, sulfur composites with Super P and PVDF binder were dispersed in NMP in a weight ratio of 82:12:6. The slurry was coated onto carbon paper. The electrodes were dried at 50° C. overnight. 2032-type coin cells were assembled using Celgard 2300 membrane as the separator and Li metal as the anode. The electrolyte was 1.0 M lithium bis(trifluoromethanesulfonyl) imide (LiTFSI) in 1,3-dioxolane and dimethoxymethane (1:1, v/v) with 2% $LiNO_3$ as an additive. The volume of electrolyte injected in the coin cell was 40 μL, for electrodes <1.5 mg $cm^{-2}$ and 60 μL, for higher loading electrodes. The galvanostatic charge/discharge measurements were carried out over a voltage window of 1.5-3.0 V using a BT2000 battery cycler (Arbin instruments).

Results and discussion. An XRD pattern acquired from a sample of hydrothermally synthesized porous $Fe_3O_4$ nanospheres shows the typical XRD features of magnetite. The morphology and size distribution of the $Fe_3O_4$ nanospheres are described herein. A high angle annular dark-field (HAADF) STEM image of a typical nanosphere shows a variation in contrast within the nanosphere, suggesting that porous channels exist inside the nanoparticle, providing a large surface area for the $Fe_3O_4$ host material to interact with sulfur and LiPSs. Measurements of particle sizes from an HAADF-STEM image containing many $Fe_3O_4$ nanospheres with a typical size range suggests that a majority of the nanospheres are 80-140 nm in diameter.

Figure 9:
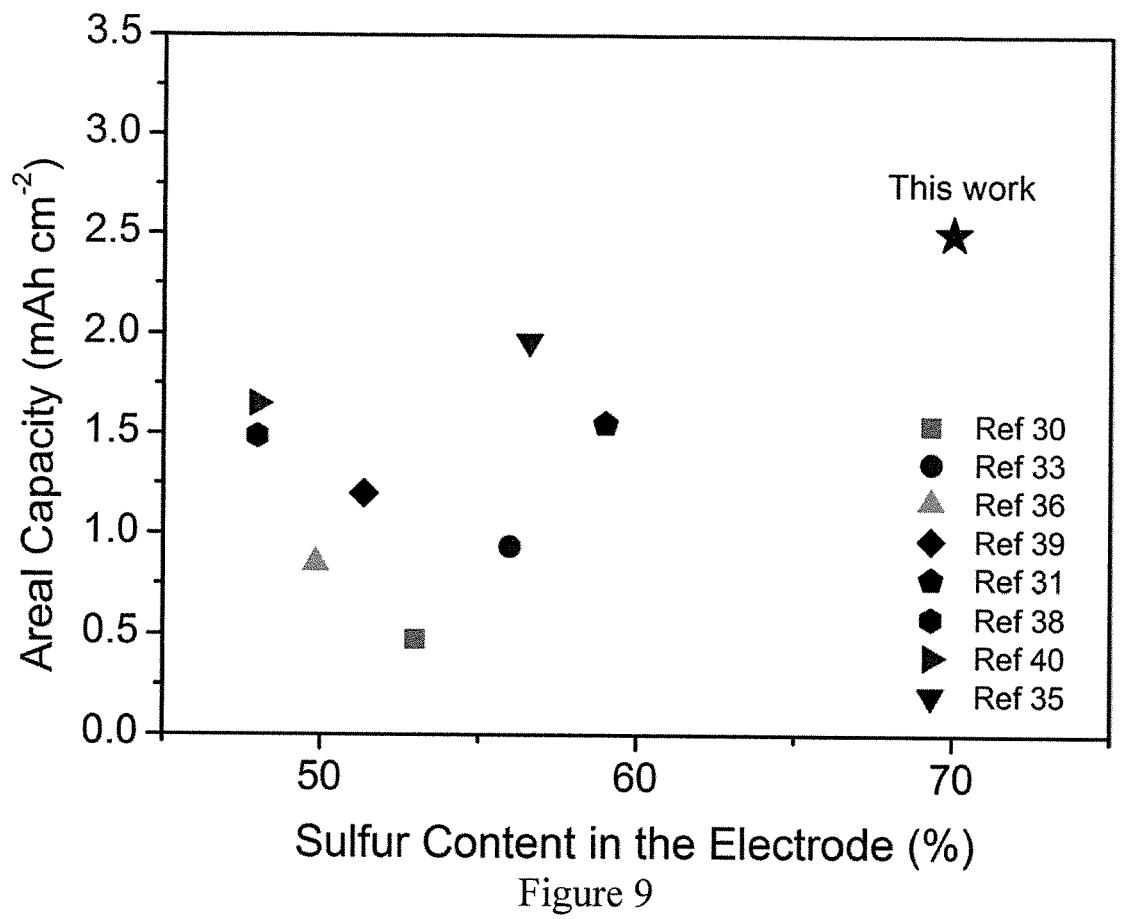
FIG. 9 shows comparison of sulfur content in the whole electrode and areal capacity of an $Fe_3O_4$/S electrode with other electrodes using metal oxides as the host matrix for sulfur, reported in the literature.

An $Fe_3O_4/S$ composite was prepared by melt-diffusion of sulfur into the $Fe_3O_4$ nanospheres. The sulfur content of a $Fe_3O_4/S$ composite of the present disclosure was determined to be 85% by thermogravimetric analysis (TGA) under an argon atmosphere (FIG. 9). XRD analysis of the $Fe_3O_4/S$ composite exhibited the XRD peaks of both magnetite and crystalline orthorhombic elemental sulfur, indicating that much of the sulfur in the composite is in crystalline form.

$Fe_3O_4$/S composite particles were further examined by optical microscopy and cryo-STEM equipped with XEDS. An extended depth of field optical image of $Fe_3O_4$/S composite particles was obtained. The image shows yellow sulfur particles, which are observed to have a size of several micrometers or more, encrusted with black $Fe_3O_4$ particles. This observation is consistent with the XRD measurements in FIG. 1A, which show the presence of crystalline sulfur and $Fe_3O_4$. Since the sulfur melt diffusion method was used in this work, it is important to know whether a significant quantity of elemental sulfur has infiltrated into the porous $Fe_3O_4$ host material at the nanometer scale. We used XEDS elemental mapping under cryo-STEM conditions to directly image the distribution of sulfur over the $Fe_3O_4$ host material. An HAADF STEM image of $Fe_3O_4$/S composite particles was obtained. The XEDS spectrum of these composite particles shows a very strong sulfur peak, which is consistent with the high mass loading (85%) of sulfur in the $Fe_3O_4$/S composite. XEDS elemental maps of these particles in cryo-STEM show well-faceted, micrometer sized, sulfur particles embedded in a network of the $Fe_3O_4$ host particles. From these images, it is clear that a majority of the sulfur remains external to the $Fe_3O_4$. The micrometer sized external sulfur particles that constitute the majority of sulfur in the sample are insulating, and are physically separated from each other, but appear to be well interconnected by the conductive network formed by $Fe_3O_4$ nanoparticle clusters. Though sulfur is not encased in $Fe_3O_4$, polysulfides can adsorb onto $Fe_3O_4$, due to chemical interactions, leading to improved battery performance.

The electrochemical performance of $Fe_3O_4$/S composites was carried out in 2032-type coin cells. Cyclic voltammetry (CV) profiles of $Fe_3O_4$/S composite employed as a cathode material in Li—S cells are described herein. In the cathodic scan, two well-defined reduction peaks at 2.23 V and 1.82 V can be observed, corresponding well to the generally accepted multistep reduction mechanism of $S_8$. The first peak corresponds to the reduction of $S_8$ to higher order polysulfides $Li_2S_n$ ($4 \leq n \leq 8$) while the second one corresponds to the further reduction to the lower polysulfides $Li_2S_x$ ($x \leq 2$). In the anodic scan, there is a peak at 2.32 V which corresponds to the oxidation of the lower polysulfides, $Li_2S_x$, to $S_8$. There were no significant changes observed for either anodic or cathodic peaks, after 10 cycles, indicating the good cycling stability of the composite cathode material.

Further described is the cycling performance of a porous $Fe_3O_4$/S composite electrode and a C/S electrode at a current rate of 0.2 C. The $Fe_3O_4$/S electrode delivered an initial discharge capacity of 867 mAh g$^{-1}$ while the C/S electrode delivered 1090 mAh g$^{-1}$. In the first few cycles, it was found that the capacity of the C/S cathode was higher than that of the $Fe_3O_4$/S electrode, which may be due to the large surface area of carbon having better contact with the sulfur. However, over longer-term cycling, the capacity retention of the $Fe_3O_4$/S composite was superior to that of the C/S electrode. After 100 cycles, the $Fe_3O_4$/S electrode retained a capacity of 680 mAh g$^{-1}$, corresponding to a capacity retention of 78%, which is much higher than that of the C/S electrode (49%). Clearly, the $Fe_3O_4$/S composite displays superior cycling stability when compared to C/S. Long-term cycling of $Fe_3O_4$/S was also investigated at a rate of 0.5 C. A high capacity retention, as high as 67%, was obtained after 300 cycles.

Figure 5:
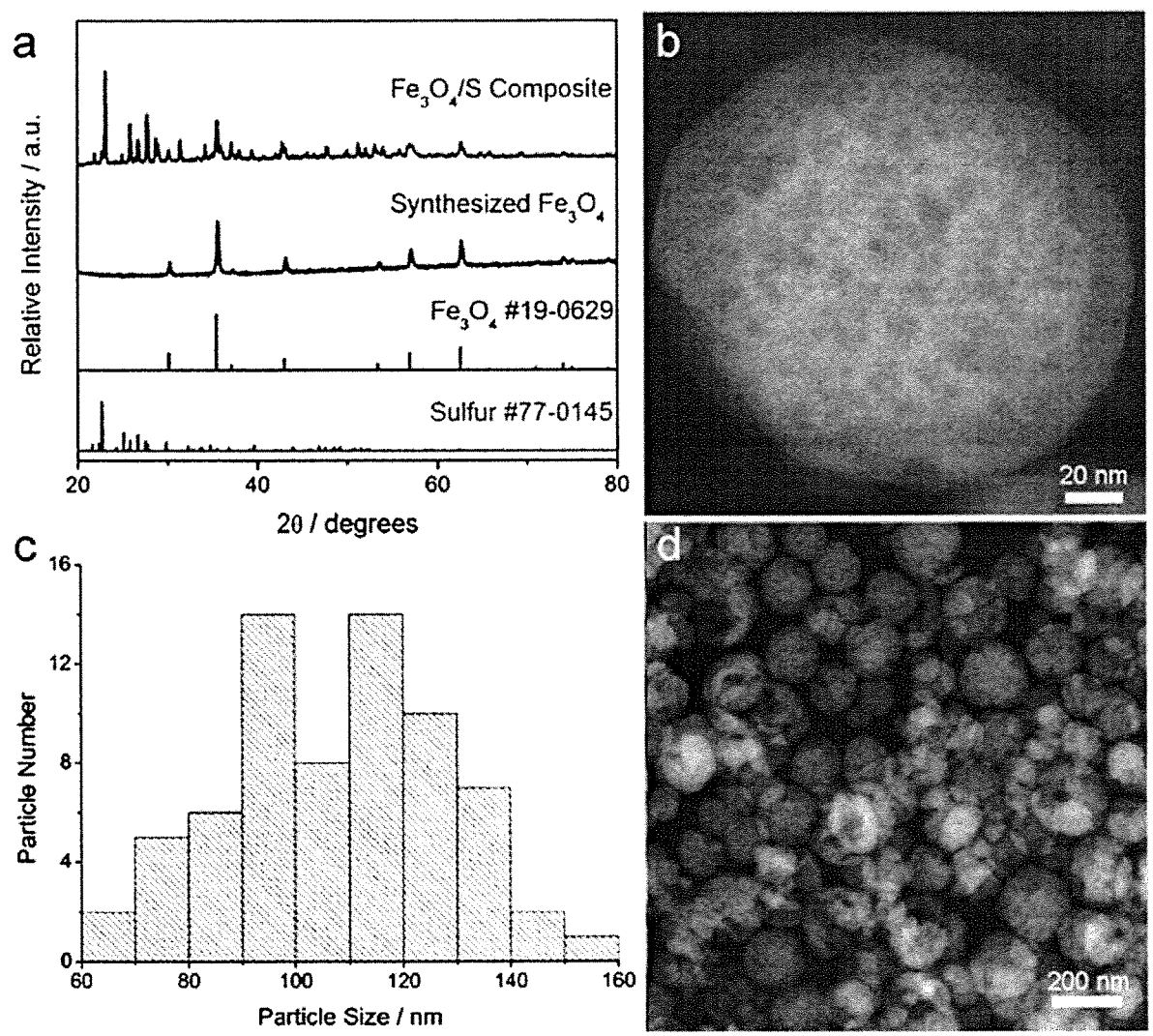
FIG. 5 shows (a) powder XRD of the as-synthesized $Fe_3O_4$ and $Fe_3O_4$/S composite compared with the standard XRD of $Fe_3O_4$ and elemental sulfur. (b) High-magnification STEM image of a representative $Fe_3O_4$ nanosphere with porous inner structure. (c,d) HAADF-STEM image of porous $Fe_3O_4$ nanospheres and the corresponding particle distribution.
Figure 6:
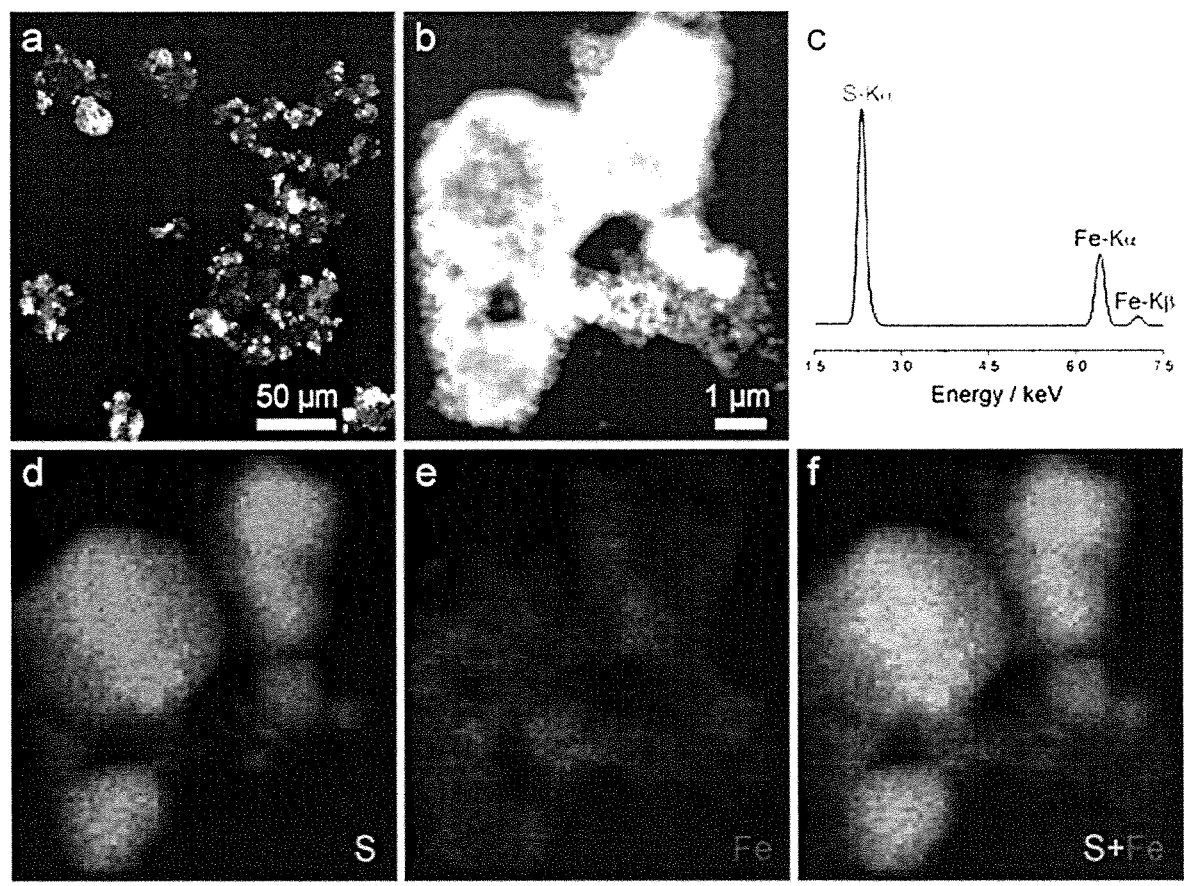
FIG. 6 shows (a) optical microscopy images, with extended depth of field, for black $Fe_3O_4$ with yellow sulfur composite. (b) HAADF-STEM image of $Fe_3O_4$/S composite. (c) Part of the XEDS sum spectrum of the $Fe_3O_4$/S composite, showing iron and sulfur X-ray peaks. (d-f) XEDS elemental mapping of sulfur, iron and color overlay of sulfur and iron.

Having electrodes with high sulfur loading is of great importance for numerous applications, especially automotive. To assess this, electrodes with high areal loadings of 1.9, 2.8 and 3.7 mg/cm$^2$ were prepared and tested. FIG. 5 shows the cycling performance of these high S-loading electrodes. All of them exhibited excellent stability for over 150 cycles. An initial areal capacity of 3.7 mAh cm$^{-2}$ was obtained at 0.05 C for the first cycle and a high areal capacity of 2.5 mAh cm$^{-2}$ was maintained after 150 cycles at 0.2 C. This value indicates that a $Fe_3O_4$/S composite electrode of the present disclosure could be applied in applications requiring high-energy and long life-time. Galvanostatic charge/discharge profiles are shown in FIG. 6. There are two discharge plateaus and one charge plateau, in good agreement with the CV profiles. In addition, it is evident that increasing the sulfur loading did not give rise to increased polarization losses (overpotentials) during charge and discharge cycles, likely due to the fast kinetics of the material.

Figure 7:
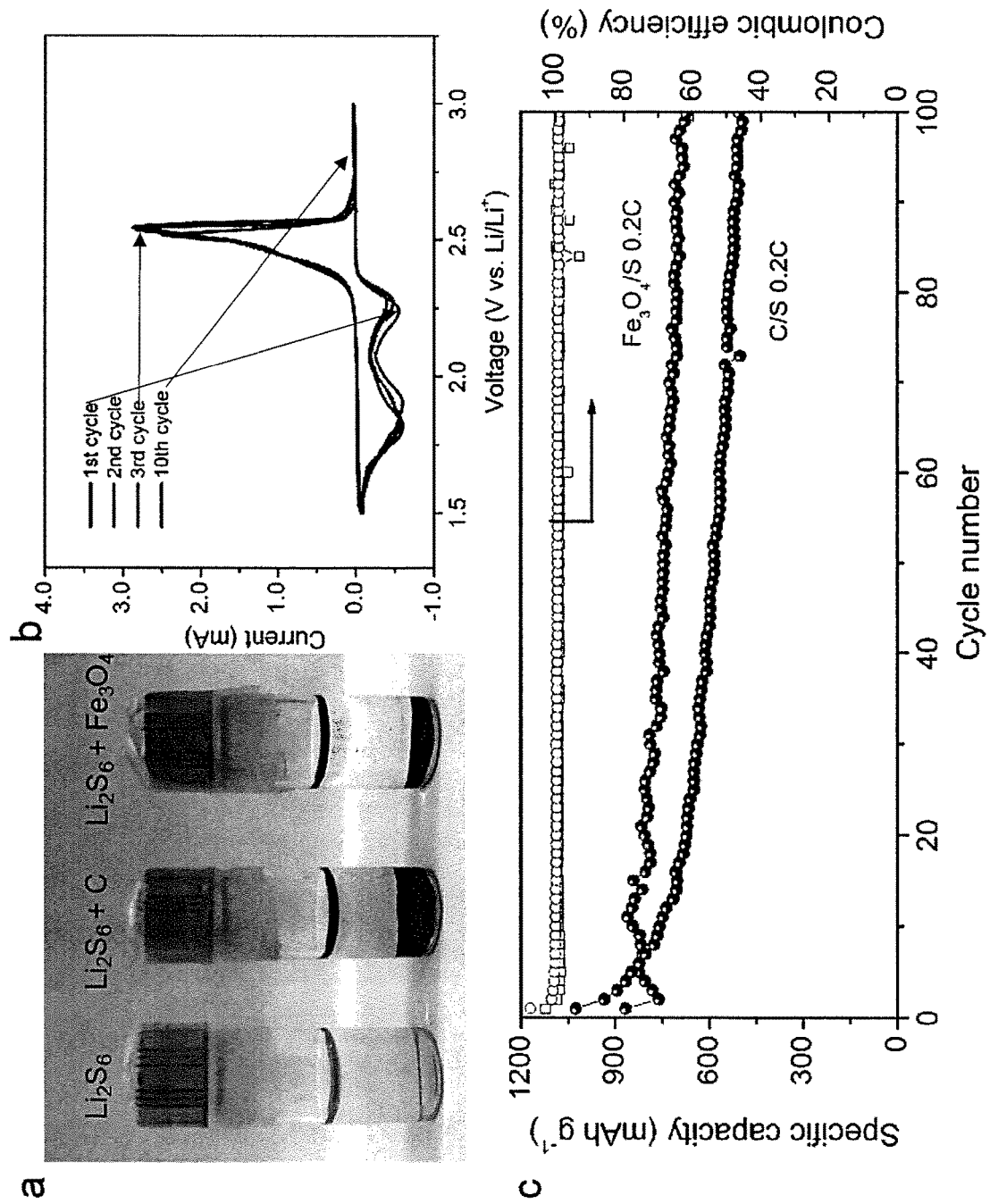
FIG. 7 shows (a) $Li_2S_6$ adsorption test. Left to right: $Li_2S_6$ solution, $Li_2S_6$ with the addition of carbon and $Li_2S_6$ with $Fe_3O_4$. The solution became colorless after mixing with $Fe_3O_4$ but remained yellow after mixing with carbon. (b) Cyclic voltammetry of $Fe_3O_4$/S at scan rate of 0.1 mV (c) Cycling performance of $Fe_3O_4$/S composite and C/S composite at 0.2 C.

To rule out the capacity contribution from $Fe_3O_4$, a pure $Fe_3O_4$ electrode was also tested over the potential range of 1.5-3.0 V. As FIG. 7 illustrates, porous $Fe_3O_4$ had a negligible capacity within the working voltage window of sulfur.

Although it was observed that sulfur does not infiltrate into the pores of the $Fe_3O_4$ nanospheres during melt diffusion, the polar nature of both $Fe_3O_4$ and LiPSs suggests that LiPSs may adsorb onto $Fe_3O_4$ due to chemical interactions during battery cycling. The ability of $Fe_3O_4$ to adsorb LiPSs was assessed by adding porous $Fe_3O_4$ nanospheres and porous carbon, respectively, to a polysulfide solution of 1 mM $Li_2S_6$ in dioxolane/dimethoxyethane (DME/DOL, 1:1 by volume). Described are the interactions between polysulfides and $Fe_3O_4$. The solution became colorless upon the addition of $Fe_3O_4$ nanospheres while the solution remained yellow after the addition of porous carbon. This observation clearly indicates that there is an interaction between the $Fe_3O_4$ nanospheres and LiPSs, likely due to its polar nature, suggesting that the $Fe_3O_4$ nanospheres will interact with LiPSs produced during battery cycling.

The excellent overall electrochemical performance of the $Fe_3O_4$/S cathodes can be attributed, at least in part, to the following factors. First, as a host material $Fe_3O_4$ provides high electrical conductivity for electron transfer. Second, the porous structure of $Fe_3O_4$ can offer higher surface area than other metal oxides reported in the literature. A higher contact area, between the host and the active material, is beneficial for physically constraining lithium polysulfides. Third, the polar nature of $Fe_3O_4$ can provide strong binding sites for the polar lithium polysulfides during charging and discharging.

In conclusion, it was demonstrated $Fe_3O_4$ as a promising sulfur host for high-energy and stable Li—S batteries. Porous $Fe_3O_4$ was synthesized via a facile hydrothermal reaction. Due to the high conductivity and chemical adsorption properties of $Fe_3O_4$, the porous $Fe_3O_4$/S composite cathode exhibits excellent cycling stability. Moreover, high sulfur loading electrodes also showed superior cycling performance with a high areal capacity of 2.5 mAh cm$^{-2}$ after 150 cycles. By combining the high conductivity of $Fe_3O_4$ as well as the physical and chemical confinement of lithium polysulfides, the performance of lithium sulfur batteries has been desirably enhanced.

Example 2

The following example describes preparation and characterization of $Fe_3O_4$ nanospheres of the present disclosure.

Lithium-sulfur batteries are considered to be one of the most promising candidates for next-generation "beyond lithium-ion" energy-storage systems. However, the commercialization of lithium sulfur batteries has been hindered by fast capacity fade caused by polysulfide shuttling problems, as well as by a limited volumetric energy density due to low sulfur loading. Herein, porous $Fe_3O_4$ nanospheres were employed as a sulfur host to address the polysulfide shuttling problem through chemical interactions. Optical microscopy and cryogenic scanning transmission electron microscopy (cryo-STEM) with X-ray energy dispersive spectroscopy (XEDS) elemental mapping were employed to study the inherent microstructure of an $Fe_3O_4$/S composite with 85% sulfur content. Well-faceted, micrometer-sized sulfur particles embedded in a network of the conductive $Fe_3O_4$ nanosphere host particles were observed. $Fe_3O_4$/S composite of the present disclosure shows high capacity and outstanding cycling stability. The initial areal capacity is 2.6 mAh $cm^{-2}$ and a high areal capacity of 2.2 mAh $cm^{-2}$ was retained after 150 cycles. Without intending to be bound by any particular theory, it is believed that both the embedding of sulfur in a conductive $Fe_3O_4$ network, and the strong chemical interactions between $Fe_3O_4$ and polysulfides are responsible for the high capacity and high cycling stability of a $Fe_3O_4$ composite cathode of the present disclosure.

Herein, it is described that that $Fe_3O_4$ can significantly improve the cycling stability of sulfur electrodes in Li—S batteries. $Fe_3O_4$ is one of the most inexpensive metal oxides with high electronic conductivity ($2\times10^4$ S $m^{-1}$) and low toxicity. Porous $Fe_3O_4$ nanoparticles were synthesized using a facile hydrothermal reaction, and an $Fe_3O_4$/S composite was obtained via a melt diffusion method, which is suitable for large scale production. A $Fe_3O_4$/S composite of the present disclosure, with 85% sulfur content, exhibited high capacity and outstanding cycling stability. The initial areal capacity was 2.6 mAh $cm^{-2}$ and a high areal capacity of 2.2 mAh $cm^{-2}$ was achieved and maintained after 150 cycles. To study the structure and distribution of sulfur in a $Fe_3O_4$/S composite of the present disclosure, without sulfur sublimation artifacts, a combination of optical microscopy and cryogenic scanning transmission electron microscopy (cryo-STEM) were employed. Cryo-STEM has previously been shown to suppress sulfur sublimation in vacuum and preserve the inherent distribution of sulfur in sulfur battery samples in an electron microscope. This combination of cryo-STEM together with simple optical microscopy, provides a more accurate understanding of the structure of a $Fe_3O_4$/S composite of the present disclosure, and is useful for studying other Li—S battery systems.

Experimental section. Preparation of porous $Fe_3O_4$: Porous $Fe_3O_4$ nanospheres were synthesized via a hydrothermal reaction. 1.35 g of $FeCl_3 \cdot 6H_2O$ were dissolved in 60 mL of ethylene glycol, followed by the addition of 3.85 g of ammonium acetate. After stirring for 90 min, the solution was transferred to a Teflon-lined stainless steel autoclave with a capacity of 100 mL, and kept at 200° C. for 20 h. After cooling down, the precipitate was centrifuged and washed with deionized water.

Preparation of $Fe_3O_4$/S composites. $Fe_3O_4$/S composites were prepared via a simple melt diffusion method. A mixture of porous $Fe_3O_4$ nanospheres and sulfur powder (15:85 weight ratio) was heated under an ambient atmosphere at 155° C. for 12 h.

Preparation of $Li_2S_6$. A $Li_2S_6$ solution was prepared by dissolving stoichiometric amounts of $Li_2S$ and elemental S into 1,2-dimethoxyethane and 1,3-dioxolane (DME/DOL, 1:1 in volume) at 60° C. overnight in an argon glovebox.

Structural Characterization. X-ray diffraction (XRD) patterns were recorded from samples of $Fe_3O_4$ and the $Fe_3O_4$/S composite using a Rigaku Ultima VI diffractometer with a Cu Kα source. Diffraction patterns were collected at a scan rate of 5° min' and with an increment of 0.02°.

A white light reflectance optical microscope (Olympus) was used to acquire extended depth of field images of samples of $Fe_3O_4$/S composite particles, which were dispersed in ethanol, and transferred onto a glass slide. $Fe_3O_4$/S composite particles dispersed in ethanol were transferred onto copper transmission electron microscope (TEM) grids with a lacey carbon film (Electron Microscopy Sciences) for characterization by TEM. TEM grids containing the sample were loaded into a Gatan model 914 cryo-holder under nitrogen gas, near liquid nitrogen temperature. The holder kept the sample at a stable temperature of about −180° C. STEM images were acquired using an FEI Tecnai F-20 microscope operated at 200 keV. XEDS elemental mapping was performed using an Oxford X-Max detector.

Electrochemical measurements. Electrodes with <1.5 mg cm' sulfur loading were prepared for the basic cycling tests by mixing the $Fe_3O_4$/sulfur composite described above with super P carbon and polyvinylidene fluoride (PVdF) binder in N-methyl-2-pyrrolidone (NMP) in a weight ratio of 75:15:10. The resulting slurry was doctor-blade coated onto carbon coated Al foil current collectors to prepare the cathodes. For the areal capacity measurements, the preparation of high sulfur loading electrodes (~70 wt. % of sulfur in the entire electrode composite assembly), $Fe_3O_4$/sulfur composites with super P and PVdF binder were dispersed in NMP in a weight ratio of 82:12:6. The slurry was coated onto carbon paper. The electrodes were dried at 50° C. overnight.

2032-type coin cells were assembled in an argon-filled glovebox (<0.30 ppm oxygen). Celgard 2300 membrane was used as the separator and Li metal as the anode. The electrolyte was 1.0 M lithium bis(trifluoromethanesulfonyl) imide (LiTFSI) in 1,3-dioxolane and 1,2-dimethoxyethane (DOL/DME, 1:1 by volume) with 2% $LiNO_3$ as an additive. The volume of electrolyte injected in the coin cell was 40 μL for electrodes <1.5 mg $cm^{-2}$ and 60 μL for higher loading electrodes. Cyclic voltammetry (CV) profiles were recorded over the potential range from 1.5 to 3.0 V (vs. $Li^+$/Li) at a sweep rate of 0.1 mV $s^{-1}$. Galvanostatic charge/discharge measurements and CV were carried out over a voltage window of 1.5-3.0 V using a BT2000 battery cycler (Arbin instruments).

Results and Discussion. An XRD pattern acquired from a sample of hydrothermally synthesized porous $Fe_3O_4$ nanospheres showed the typical XRD features of magnetite (FIG. 5a). The morphology and size distribution of the $Fe_3O_4$ nanospheres are presented in FIGS. 5b-d. A high angle annular dark-field (HAADF) STEM image of a typical nanosphere (FIG. 5b) shows a variation in contrast within the nanosphere, suggesting that porous channels exist inside the nanoparticle, providing large surface area for the $Fe_3O_4$ host material to interact with sulfur and LiPSs. A specific surface area of 16.6 $m^2$ $g^{-1}$ for the porous $Fe_3O_4$ nanospheres was determined by Brunauer-Emmett-Teller (BET) analysis. Measurements of particle sizes from an HAADF-STEM image containing many $Fe_3O_4$ nanospheres with a typical size range suggests that a majority of the nanospheres are 80-140 nm in diameter (FIGS. 5c-d).

Figure 10:
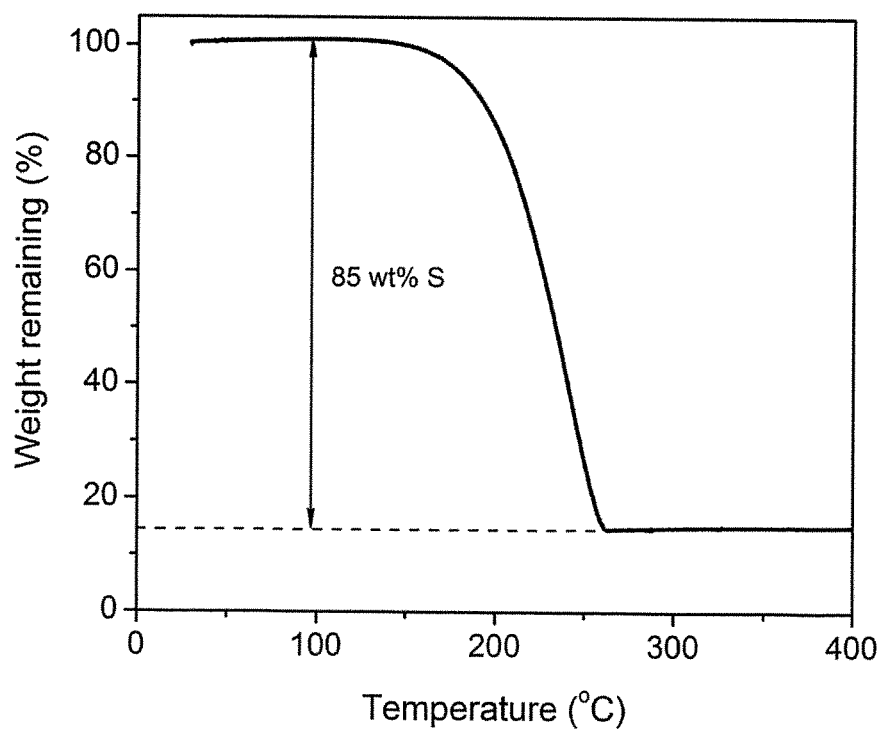
FIG. 10 shows a TGA curve of $Fe_3O_4$/S under an Ar flow with a temperature ramp rate of 10° C./min.
Figure 11:
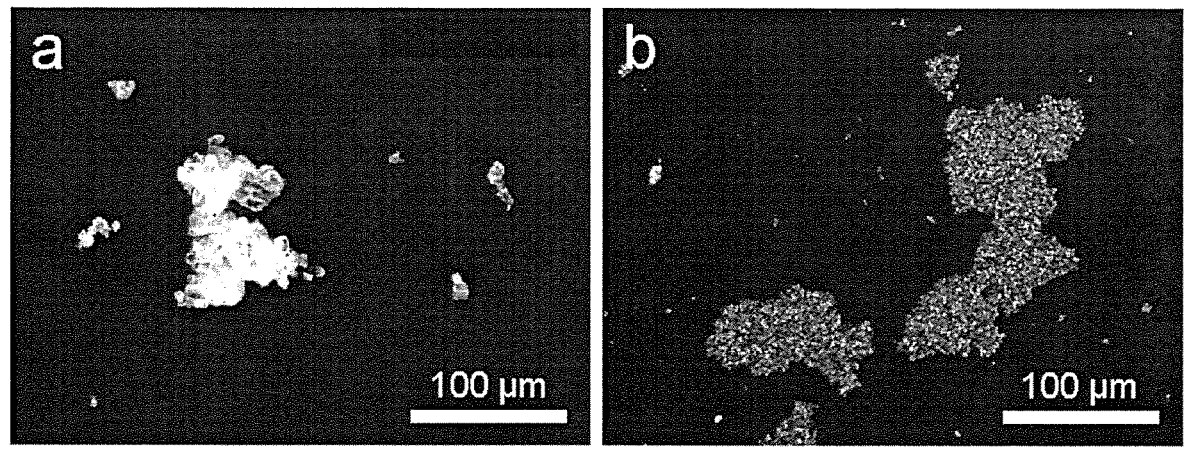
FIG. 11 shows optical microscopy images of crushed commercial sulfur particles (A) and synthesized host material, $Fe_3O_4$ powder (B).
Figure 12:
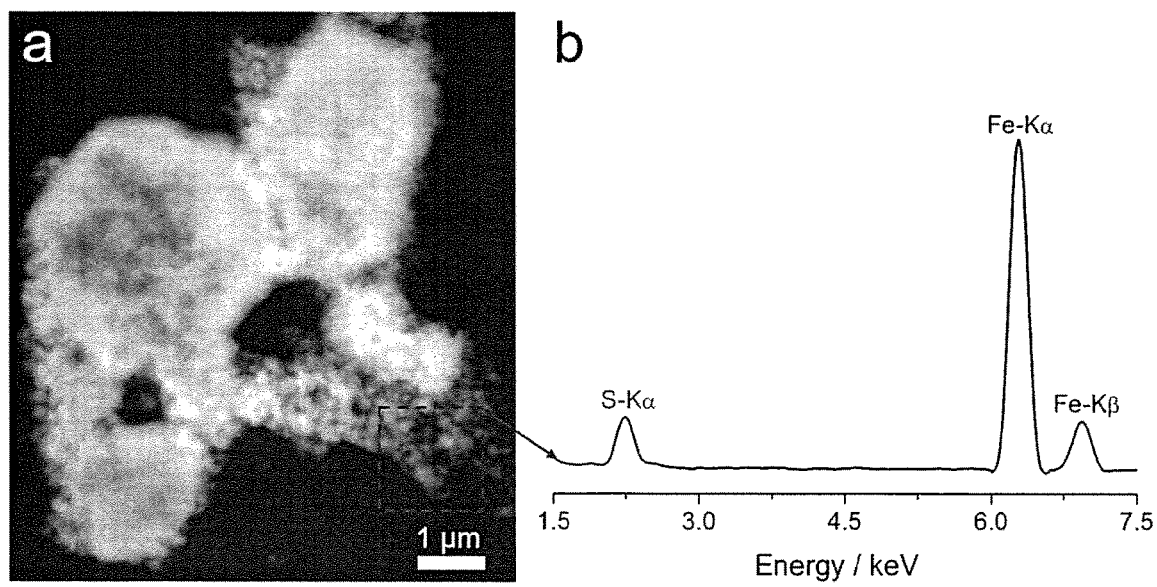
FIG. 12 shows (a) cryo-STEM image of $Fe_3O_4$/S composite particles (b) XEDS spectrum corresponding to the $Fe_3O_4$ region with a weak S signal relative the Fe signal (indicated in the dashed red box).
Figure 13:
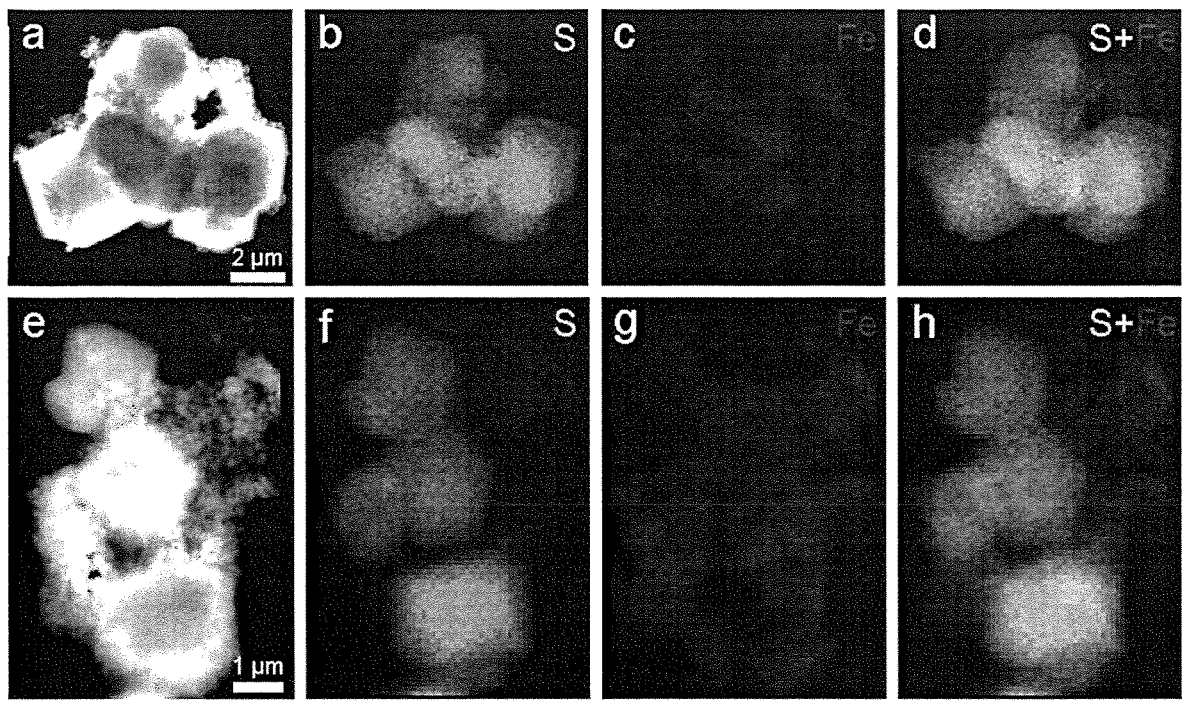
FIG. 13 shows (A, E) HAADF-STEM image of $Fe_3O_4$/S composite particles. (B, F) XEDS elemental mapping of S. (C, G)) XEDS elemental mapping of Fe. (D, H) XEDS elemental mapping of color overlay of S and Fe.

An $Fe_3O_4$/S composite was prepared by melt-diffusion of sulfur into the $Fe_3O_4$ nanospheres. The sulfur content of a $Fe_3O_4$/S composite of the present disclosure was determined to be 85% by thermogravimetric analysis (TGA) under an argon atmosphere (FIG. 10). XRD analysis of the $Fe_3O_4$/S composite exhibited the XRD peaks of both magnetite and crystalline orthorhombic elemental sulfur (FIG. 5a), indicating that much of the sulfur in the composite is in crystalline form. $Fe_3O_4$/S composite particles were further examined by optical microscopy and cryo-STEM equipped with X-ray energy dispersive spectroscopy (XEDS). Optical microscopy is a useful technique for studying materials at the micrometer scale, and screening of samples in an optical microscope, prior to study by electron microscopy, helps to ensure that nanoscale observations made in an electron microscope are truly representative of the bulk material. This is desirable for samples containing elemental sulfur, as samples can be studied in an optical microscope without exposure to vacuum. FIG. 6a shows an extended depth of field optical image of $Fe_3O_4/S$ composite particles. The image shows yellow sulfur particles encrusted with black $Fe_3O_4$ particles. This observation is consistent with XRD measurements in FIG. 5a, which show the presence of crystalline sulfur and $Fe_3O_4$. Optical images from a sample containing only sulfur particles, and a sample containing only $Fe_3O_4$ nanoparticle powder are shown for comparison in FIG. 11. After screening by optical microscopy, cryo-STEM with XEDS was used to directly image the distribution of sulfur over the $Fe_3O_4$ host material. FIG. 6b shows an HAADF STEM image of $Fe_3O_4/S$ composite particles. The XEDS spectrum of these composite particles shows a very strong sulfur peak, which is consistent with the high mass loading (85%) of sulfur in the $Fe_3O_4/S$ composite (FIG. 6c). XEDS elemental maps of these particles in cryo-STEM exhibited well-faceted, micrometer sized, sulfur particles embedded in a network of the $Fe_3O_4$ host particles (FIGS. 6d-f). The XEDS spectrum from some of the $Fe_3O_4$ particles exhibits a weak S signal relative to the Fe signal, indicating the relatively weak sulfur infiltration into $Fe_3O_4$ nanospheres (FIG. 12). Additional images of other composite particles, showing the same structure (FIG. 13). From these images, it is clear that a majority of the sulfur particles are in close physical contact with the conductive network formed by $Fe_3O_4$ nanoparticle clusters (FIGS. 6e-f), which is similar to layered $TiS_2$ as sulfur hosts.

The polar nature of both $Fe_3O_4$ and LiPSs suggests that LiPSs may adsorb onto $Fe_3O_4$ due to chemical interactions during battery cycling. The ability of $Fe_3O_4$ to adsorb LiPSs was investigated by adding porous $Fe_3O_4$ nanospheres and porous carbon, respectively, to a polysulfide solution of 1 mM $Li_2S_6$ in DOL/DME (1:1 by volume). FIG. 7a shows that the polysulfide solution becomes colorless after the addition of $Fe_3O_4$ nanospheres while the solution remains yellow after the addition of porous carbon. This indicates that there is a strong interaction between the $Fe_3O_4$ nanospheres and LiPSs, suggesting that the $Fe_3O_4$ nanospheres will interact with LiPSs produced during battery cycling.

Electrochemical performance testing of the $Fe_3O_4/S$ composites was carried out in 2032-type coin cells. Cyclic voltammetric (CV) profiles of the $Fe_3O_4/S$ composite employed as a cathode material in Li—S cells are shown in FIG. 7b. In the cathodic scan, two well-defined reduction peaks at 2.23 V and 1.82 V can be observed, corresponding well to the generally accepted multi-step reduction mechanism of $S_8$. The first peak corresponds to the reduction of $S_8$ to higher order polysulfides $Li_2S_n$ (4≤n≤8) while the second peak corresponds to the further reduction to the lower polysulfides $Li_2S_x$ (x≤2). In the anodic scan, there is one oxidation peak at 2.32 V that corresponds to the oxidation of the lower polysulfides $Li_2S_x$ to $S_8$. It can be clearly observed that there were no significant changes for either anodic or cathodic peaks after 10 cycles, pointing to the high cycling stability of the composite cathode material.

Figure 14:
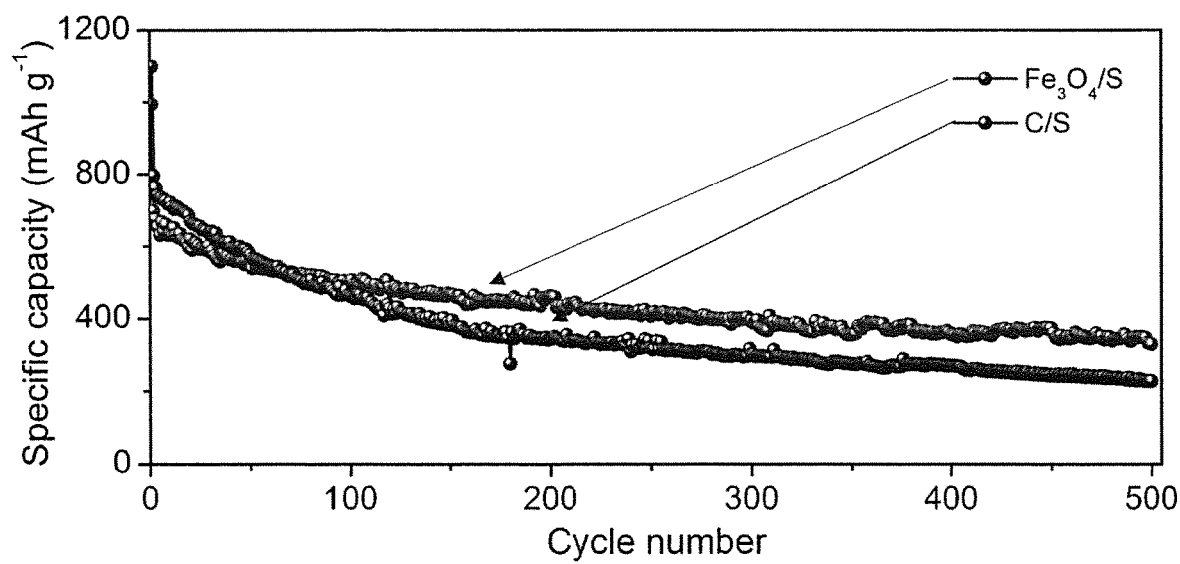
FIG. 14 shows long-term cycling performance of $Fe_3O_4$/S composite and C/S at a C-rate of 0.5 C for 500 cycles.
Figure 15:
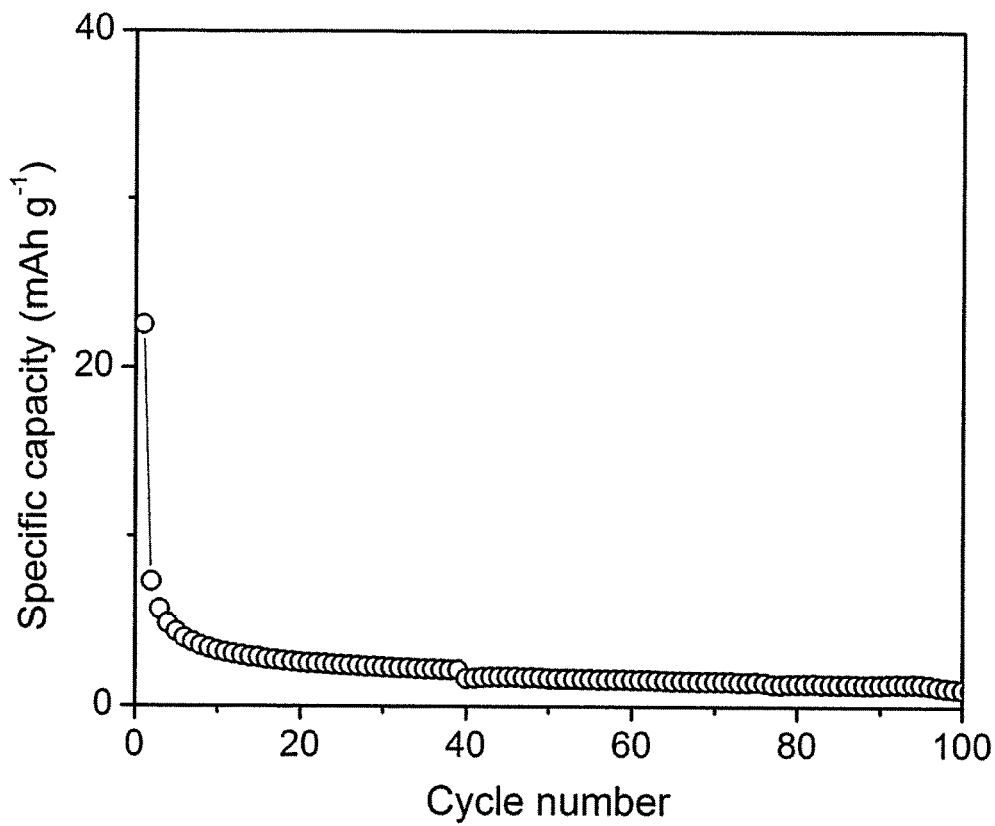
FIG. 15 shows electrochemical performance of the synthesized $Fe_3O_4$ nanospheres.

The cycling performances of a porous $Fe_3O_4/S$ composite electrode and a C/S electrode at a current rate of 0.2 C are presented in FIG. 7c. The $Fe_3O_4/S$ electrode delivered an initial discharge capacity of 867 mAh $g^{-1}$ while the C/S electrode delivered 1090 mAh $g^{-1}$. In the first few cycles, the capacity of the C/S cathode was higher than that of the $Fe_3O_4/S$ electrode, which may be due to the large surface area of carbon having better contact with the sulfur. However, over longer-term cycling, the capacity retention of the $Fe_3O_4/S$ composite was superior to that of the C/S electrode. After 100 cycles, the $Fe_3O_4/S$ electrode retained a capacity of 680 mAh $g^{-1}$, corresponding to a capacity retention of 78%, which is higher than that of the C/S electrode (49%). A high, stable Coulombic efficiency of >99% was achieved for the $Fe_3O_4/S$ composite. Long-term cycling tests of $Fe_3O_4/S$ and C/S were also carried out at a rate of 0.5 C (FIG. 14). For C/S composites, only 29% of the initial capacity was retained after 500 cycles. In comparison, a capacity retention, as high as 50%, was achieved after 500 cycles for the $Fe_3O_4/S$ composite, indicating greatly enhanced stability. Without intended to be bound by any particular theory, it is believed that this is due, at least in part, to the fact that a $Fe_3O_4/S$ composite of the present disclosure has a very high mass loading of sulfur (85%) and the host cannot provide sufficient contact area with the sulfur and, after long term cycling, some of the active material detaches from the host and diffuses into the electrolyte. To rule out any capacity contribution from the $Fe_3O_4$, a pure $Fe_3O_4$ electrode was also tested over the potential range of 1.5 to 3.0 V. As FIG. 15 illustrates, the porous $Fe_3O_4$ has negligible capacity within the working voltage window of sulfur.

Figure 16:
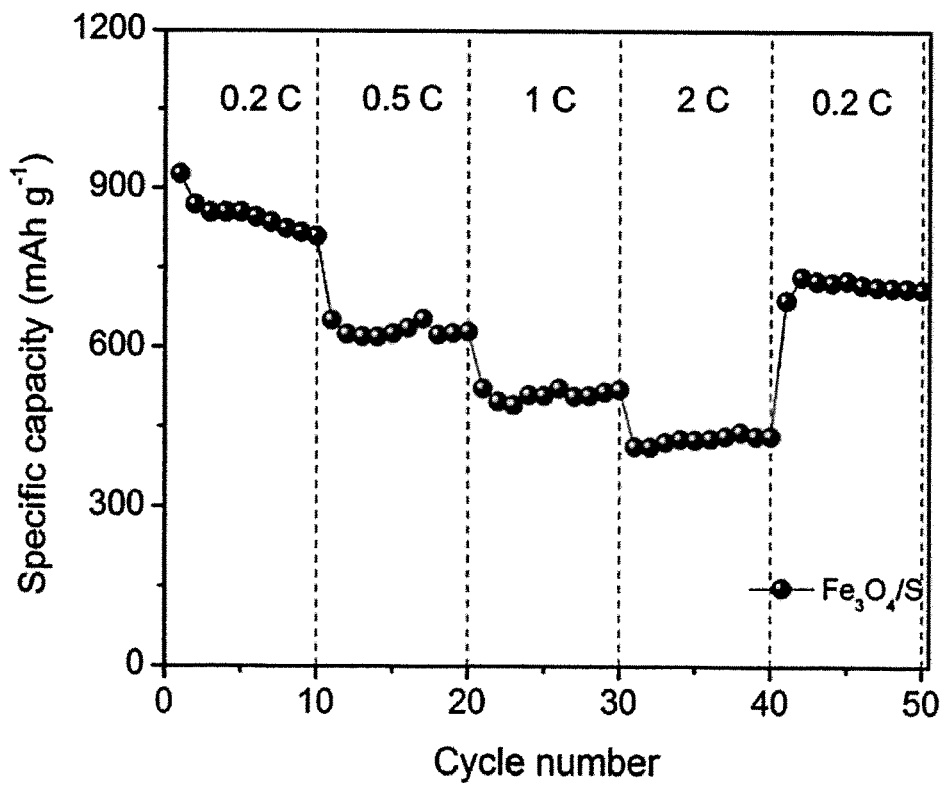
FIG. 16 shows rate capability of $Fe_3O_4$/S electrode at various C-rates.

To evaluate the rate capability and stability, tests were carried out by increasing the C-rates successively from 0.2 C to 2 C every 10 cycles, and then switched back to 0.2 C (FIG. 16). Our composite material delivered a high capacity of 450 mAh $g^{-1}$ at 2 C. Upon returning to 0.2 C, the capacity was 750 mAh $g^{-1}$, corresponding to 94% of the original capacity attained at 0.2 C, indicating robustness and stability of the composite electrode material.

Figure 4:
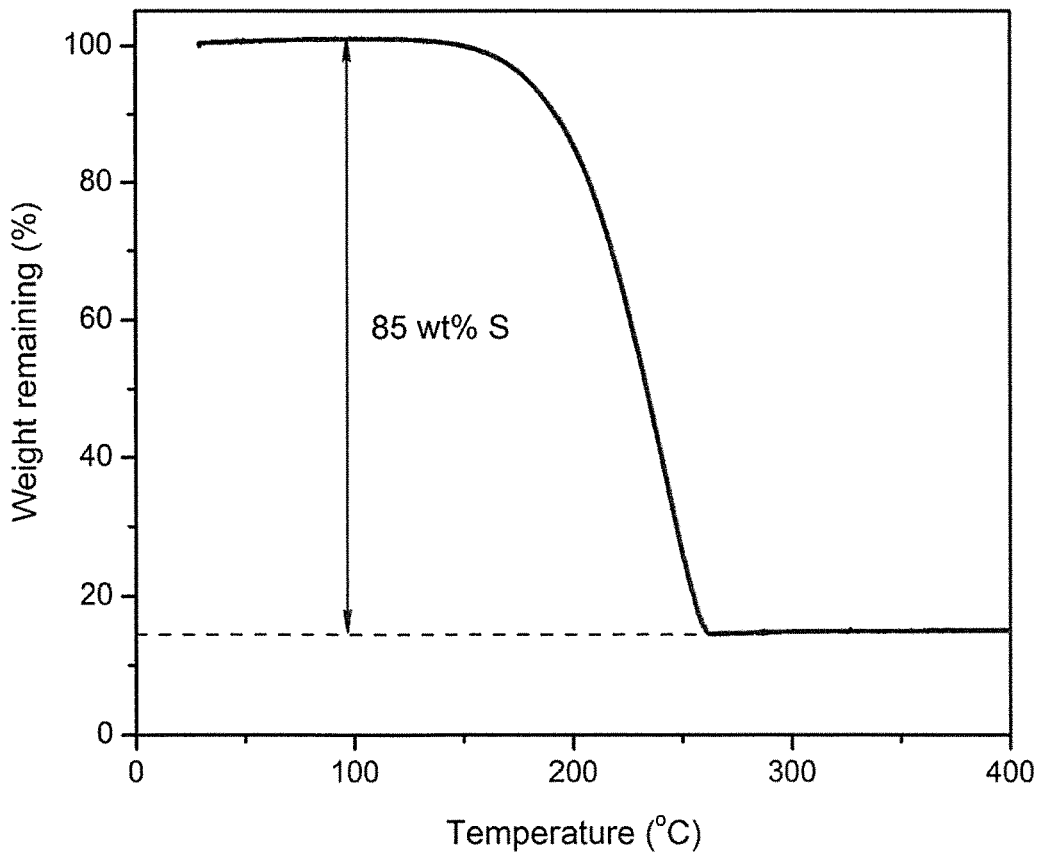
FIG. 4 shows TGA curve of $Fe_3O_4$/S under Ar flow with a temperature ramp rate of 10° C./min.
Figure 8:
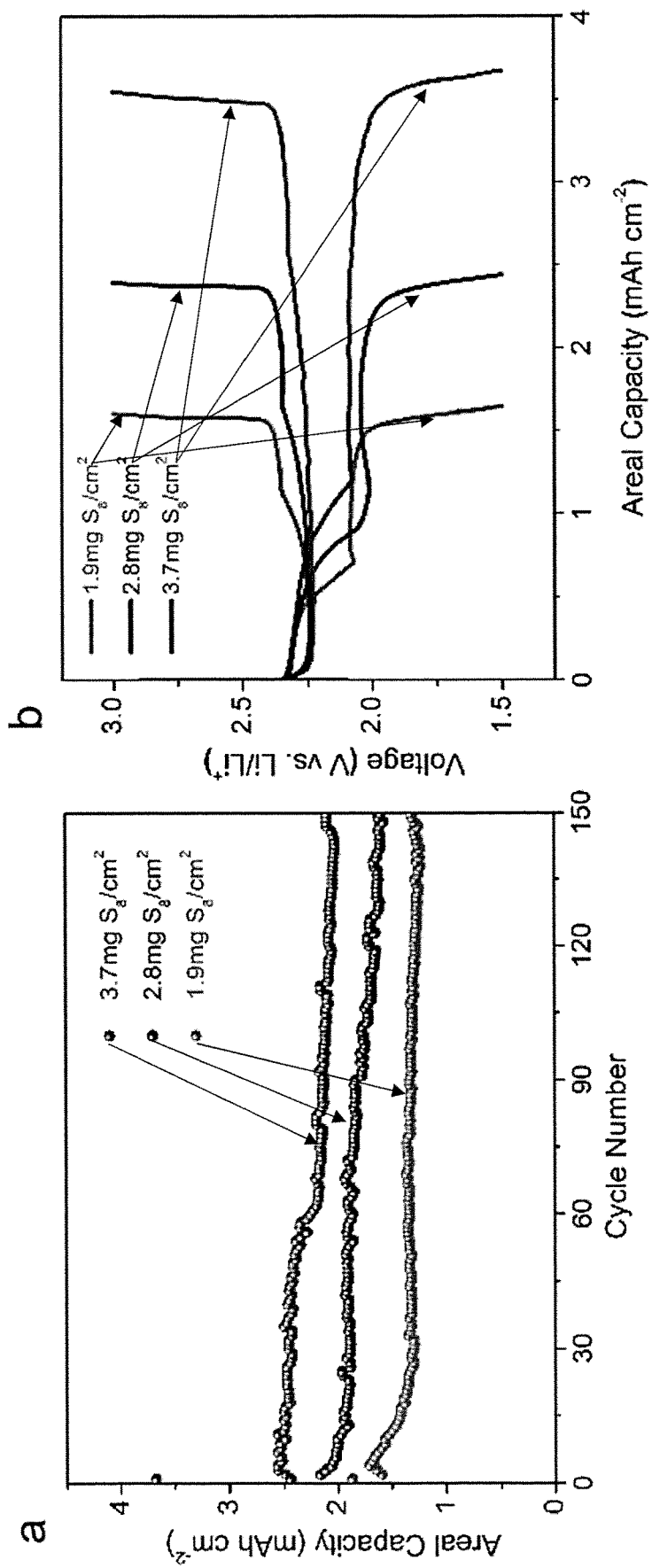
FIG. 8 shows (a) cycling performance of high-loading $Fe_3O_4$/S at a charge/discharge rate of 0.2 C for 150 cycles. (All cells were pre-conditioned at 0.05 C for the first cycle.) (b) Initial cycle voltage profile of electrodes with various sulfur mass loadings.

Due to the importance of high areal sulfur loadings for high volumetric energy density in practical applications, electrodes with high sulfur mass loadings of 1.9, 2.8 and 3.7 mg $cm^{-2}$ were prepared and tested. FIG. 4a shows the cycling performances of these high sulfur-loading electrodes. All of the electrodes exhibited desirable stability for over 150 cycles. Galvanostatic charge/discharge profiles are shown in FIG. 8b. There are two discharge plateaus and one charge plateau, in good agreement with the CV curves of the $Fe_3O_4/S$ composite shown in FIG. 7b. In addition, it is evident that increasing the areal sulfur loading did not give rise to increased polarization (overpotentials) during charge and discharge cycles, likely due to the fast kinetics of the material. An areal capacity of 2.2 mAh $cm^{-2}$ was obtained after 150 cycles.

A comparison of sulfur content in the electrode and areal capacity after 150 cycles with reports from the literature that used metal oxides as host material for sulfur is presented in FIG. 9. This figure clearly shows that a $Fe_3O_4/S$ composite electrode of the present disclosure has high sulfur content and desirable areal capacity after 150 cycles when compared to other similar metal oxide/S composites. These data indicate a $Fe_3O_4/S$ composite electrode of the present disclosure could be used in practical applications requiring high-energy and long life-time Li—S batteries.

The desirable overall electrochemical performance of $Fe_3O_4/S$ cathodes of the present disclosure can be attributed, at least in part, to the following factors. First, as a host material, $Fe_3O_4$ provides high electrical conductivity for electron transfer. As observed in optical microscopy and cyro-STEM, sulfur particles are embedded in a conductive, porous $Fe_3O_4$ nanosphere network (FIG. 6). This conductive $Fe_3O_4$ nanosphere network will facilitate charge transfer during cycling, and the pore structure of the nanospheres observed in FIG. 5 may also provide physical entrapment of LiPSs. Second, as observed from the color change of polysulfide solutions (FIG. 7a), the polar nature of $Fe_3O_4$ can provide a strong affinity for polar LiPSs, which could enrich the concentration of polysulfides near the surface of the conductive host, and further entrap LiPSs, mitigating the leaching of sulfur and/or polysulfides from the electrode during battery cycling. The porous structure of the nanospheres observed in FIG. 5 provides a large surface area for interactions between $Fe_3O_4$ and LiPSs to occur. Chemical adsorption of LiPSs during charging and discharging plays a key role in the cycling stability of a composite of the present disclosure.

Conclusions: In conclusion, $Fe_3O_4$ is a desirable sulfur host for high-energy and stable Li—S batteries. Porous $Fe_3O_4$ nanospheres were synthesized via a facile hydrothermal reaction, and mixed with sulfur via melt-diffusion to form an $Fe_3O_4$/S composite. Cryo-STEM equipped with XEDS, together with optical microscopy, enabled a reliable characterization of the distribution of elemental sulfur in $Fe_3O_4$/S composites of the present disclosure without the sulfur sublimation artifacts associated with room temperature electron microscopy. Sulfur particles were found to be embedded in the conductive network of the $Fe_3O_4$ host material, which can facilitate charge transfer during cycling. Furthermore, the porous channels within the $Fe_3O_4$, and the strong affinity between $Fe_3O_4$ and LiPSs, help entrap LiPSs during battery cycling, reducing the loss of sulfur to the electrolyte. Due to the high conductivity and chemical adsorption properties of $Fe_3O_4$, the porous $Fe_3O_4$/S composite cathode exhibits desirable cycling stability. High sulfur loading electrodes showed desirable cycling performance with an areal capacity of 2.2 mAh $cm^{-2}$ after 150 cycles. By combining the high conductivity of $Fe_3O_4$ with the chemical confinement of LiPSs, the performance of lithium sulfur batteries has been greatly enhanced.

Example 3

The following example describes porous $Fe_3O_4$ of the present disclosure.

Figure 17:
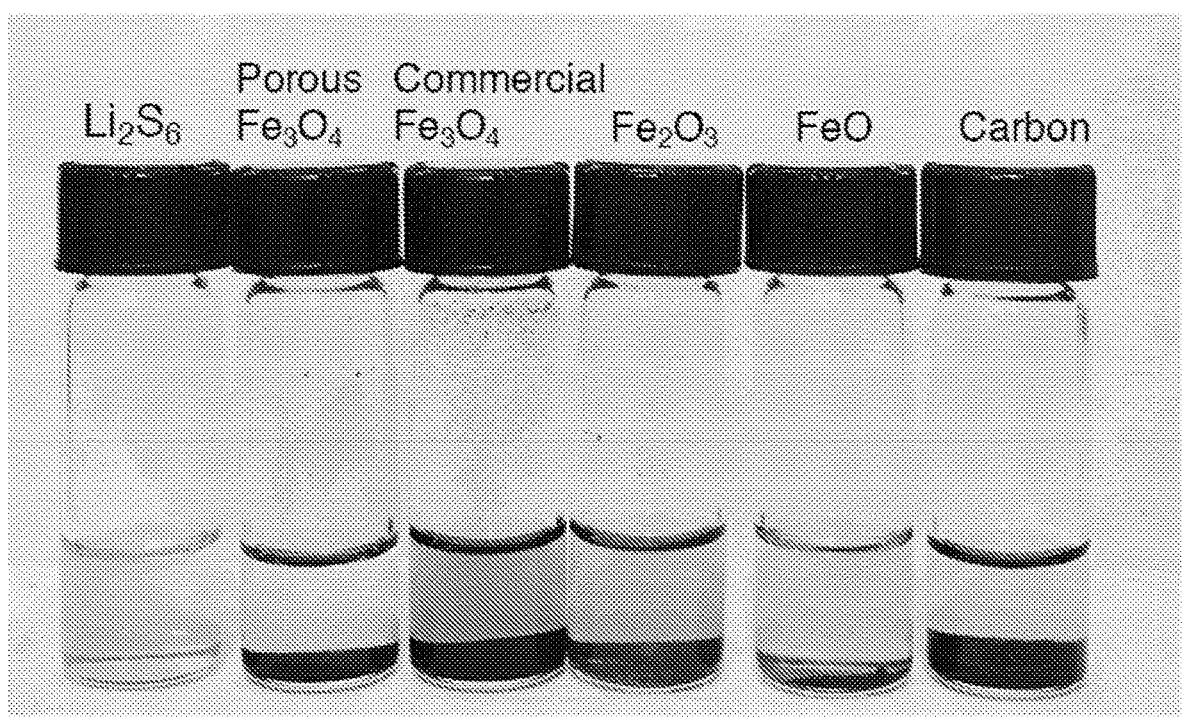
FIG. 17 shows addition of the porous $Fe_3O_4$ of the instant disclosure can the solution color change from yellow to colorless. It should be noted that the color did not change with the addition of commercial $Fe_3O_4$. It is considered that this is because commercial $Fe_3O_4$ has larger particle size (>5 µm) and smaller specific surface area than porous $Fe_3O_4$ of the instant disclosure. Other iron oxides ($Fe_2O_3$, FeO) were unable to turn the polysulfides solution colorless, even when their sizes were below 1 µm.
Figure 18:
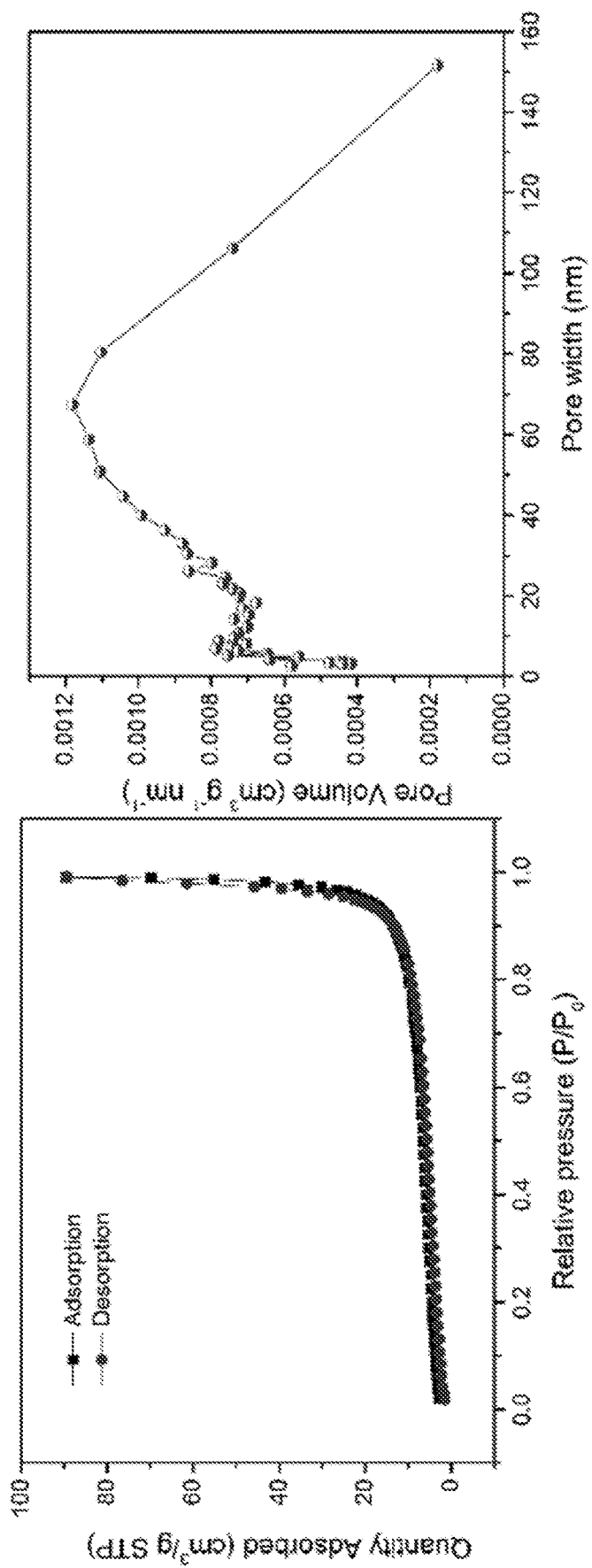
FIG. 18 shows BET nitrogen gas adsorption-desorption isotherm and corresponding pore size distribution. The specific surface area derived from BET is 16.6 $m^2/g$. The pore size distribution shows a wide distribution from 2 nm to 80 nm. It can be estimated that at least 80% of pores or channels have the diameter of less than 80 nm. The calculated average pore width is about 41 nm.

Polysulfide adsorption tests were conducted with different iron oxides, a porous $Fe_3O_4$ of the instant disclosure, commercial $Fe_3O_4$, $Fe_2O_3$, FeO, and carbon. As can be seen from FIG. 17, it is clear that only with the addition of the porous $Fe_3O_4$ of the instant disclosure can the solution color change from yellow to colorless. It should be noted that the color did not change with the addition of commercial $Fe_3O_4$. It is considered that this is because commercial $Fe_3O_4$ has larger particle size (>5 μm) and smaller specific surface area than porous $Fe_3O_4$ of the instant disclosure. Other structural properties include, but are not limited to, morphology, porosity, and pore size distribution, which may influence the high polysulfide adsorption of porous $Fe_3O_4$ of the instant disclosure when compared to other tested samples. Other iron oxides ($Fe_2O_3$, FeO) were also unable to turn the polysulfides solution colorless, even when their sizes were below 1 μm. This provides evidence that porous $Fe_3O_4$ of the present disclosure has desirable properties including, but not limited to, surface area, morphology, porosity, particle size, pore size distribution, and has better ability to adsorb more lithium polysulfides, which explains the significantly reduced polysulfide shuttling during cycling.

Example 4

The following example describes porous $Fe_3O_4$ of the present disclosure.

Pore size data. Nitrogen adsorption and desorption isotherms of porous $Fe_3O_4$ nanospheres were obtained. The specific surface area was derived using the BET (Brunauer-Emmett-Teller) method, and the pore size distribution and average pore size were estimated from the desorption branch using the BJH (Barrett-Joyner-Halenda) method. The figure shown above displays the BET nitrogen gas adsorption-desorption isotherm and corresponding pore size distribution. The specific surface area derived from BET is 16.6 $m^2$/g. The pore size distribution shows a wide distribution from 2 nm to 80 nm. It can be estimated that at least 80% of pores or channels have the diameter of less than 80 nm. The calculated average pore width is about 41 nm. The pore size distribution of the porous $Fe_3O_4$ material has at least two major peaks. The first peak ranges from 2 nm to 20 nm with the peak center located between about 5 nm and 10 nm. The second peak ranges from 20 nm to 150 nm with the peak center located between about 40 nm and 80 nm.

Polysulfide adsorption data. Polysulfide adsorption titration experiments were performed. The polysulfide adsorption titration shows that when 0.85 mL of 5 μM $Li_2S_6$ was added into 10 mg $Fe_3O_4$ nanoparticles, the solution changes from colorless to slightly yellow. From calculation, it indicates that >0.4 mmol polysulfide per gram $Fe_3O_4$ can be adsorbed. Decreased overpotential. It was observed that as the sulfur loading increases, the overpotential decreases. We hypothesize that it might be due to the high conductivity of $Fe_3O_4$ nanoparticles is able to facilitate the redox kinetics of polysulfides conversion reactions. Thus, the increased loading does not give rise to increased overpotential.

Capacity retention. It was observed that $Fe_3O_4$ nanoparticles can be used as polysulfide reservoir to reduce the polysulfide shuttle effect during the charging and discharging of the battery. At least 86% of the capacity ($2^{nd}$ cycle) was retained after 150 cycles. Areal capacity reached at least 3.5 mAh $cm^{-2}$.

While the present disclosure has been described with reference to the specific embodiments and examples it should be understood by those skilled in the art that various changes may be made and equivalents may be substituted without departing from the true spirit and scope of the disclosure. In addition, many modifications may be made to adopt a particular situation, material, composition of matter, process, process step or steps, to the objective spirit and scope of the present disclosure.

The invention claimed is:

1. A porous $Fe_3O_4$/sulfur ($Fe_3O_4$/S) composite comprising sulfur particles embedded in a porous $Fe_3O_4$ host material, wherein the porous $Fe_3O_4$ host material comprises a network of interconnected porous $Fe_3O_4$ nanoparticles, and wherein the sulfur loading is 70-85% by weight based on the total weight of the composite.

2. The porous $Fe_3O_4$/S composite of claim 1, wherein the porous $Fe_3O_4$ nanoparticles are porous $Fe_3O_4$ nanospheres.

3. The porous $Fe_3O_4$/S composite of claim 1, wherein the majority of the porous $Fe_3O_4$ nanoparticles have a longest dimension of 20-140 nm.

4. The porous $Fe_3O_4$/S composite of claim 1, wherein the porous $Fe_3O_4$ nanoparticles have a specific surface area of 20-200 $m^2$/g.

5. The porous $Fe_3O_4$/S composite of claim 1, wherein the porous $Fe_3O_4$ nanoparticles have an average pore diameter of 35-50 nm.

6. The porous $Fe_3O_4$/S composite of claim 1, wherein at least 80% of the pores of the porous $Fe_3O_4$ nanoparticles have a pore diameter of 80 nm or less.

7. The porous $Fe_3O_4$/S composite of claim 1, wherein the sulfur particles are disposed on a non-pore surface and/or a pore surface of the porous $Fe_3O_4$ nanoparticles.

8. The porous $Fe_3O_4$/S composite of claim 1, wherein the porous $Fe_3O_4$ nanoparticles decrease the amount of observable polysulfides by 50% or more in a polysulfide solution.

9. The porous $Fe_3O_4$/S composite of claim 1, wherein the porous $Fe_3O_4$ nanoparticles adsorb 0.1-10 mmol polysulfide per gram of $Fe_3O_4$.

10. The porous $Fe_3O_4$/S composite of claim 1, wherein at least a portion of the sulfur particles are crystalline.

11. A battery comprising one or more cathode comprising a porous $Fe_3O_4$/S composite of claim 1.

12. The battery of claim 11, wherein the cathode comprises a layer of the porous $Fe_3O_4$/S composite having a thickness of 1-500 μm.

13. The battery of claim 11, wherein the battery is a rechargeable battery.

14. The battery of claim 11, wherein the battery comprises one or more anode and/or one or more electrolyte and/or one or more current collector and/or one or more additional structural components.

15. A battery comprising a plurality of cells, each cell comprising one or more cathode comprising a porous $Fe_3O_4$/S composite of claim 1, and optionally, one or more anode(s), electrolyte(s), and current collector(s).

16. The porous $Fe_3O_4$/S composite of claim 1, wherein the sulfur particles are sulfur microparticles.

17. The porous $Fe_3O_4$/S composite of claim 1, further comprising a carbonaceous material and a binder material.

18. The porous $Fe_3O_4$/S composite of claim 1, wherein the porous $Fe_3O_4$ nanoparticles have a pore size distribution comprising at least two peaks, wherein the center of a first peak is less than 20 nm, and wherein the maximum of a second peak is greater than 30 nm.

19. The porous $Fe_3O_4$/S composite of claim 1, wherein the porous $Fe_3O_4$ nanoparticles have a pore size distribution comprising a first peak and a second peak, wherein the center of a first peak is in a range from 2 nm to 20 nm, and a center of a second peak is in a range from 20 nm to 150 nm.

* * * * *